(12) United States Patent
Liu et al.

(10) Patent No.: US 8,787,854 B2
(45) Date of Patent: Jul. 22, 2014

(54) LOW POWER LOCAL OSCILLATOR SIGNAL GENERATION

(75) Inventors: Li Liu, San Diego, CA (US); Prasad Srinivasa Siva Gudem, San Diego, CA (US); Frederic Bossu, San Diego, CA (US); Chiewcharn Narathong, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/557,382

(22) Filed: Jul. 25, 2012

(65) Prior Publication Data

US 2014/0030991 A1    Jan. 30, 2014

(51) Int. Cl.
*H04B 3/04*    (2006.01)

(52) U.S. Cl.
USPC ............ 455/141; 455/127.5; 455/343.2

(58) Field of Classification Search
USPC ........... 455/132, 138, 140, 141, 127.1, 127.5, 455/209, 216, 258, 323, 343.1, 343.2
See application file for complete search history.

(56) References Cited

U.S. PATENT DOCUMENTS

| | | | |
|---|---|---|---|
| 5,564,099 A | 10/1996 | Yonekura et al. | |
| 6,826,418 B2 | 11/2004 | Adachi et al. | |
| 7,209,720 B2 | 4/2007 | Balasubramaniyan et al. | |
| 7,486,942 B2 | 2/2009 | Sakurai | |
| 8,290,452 B2 * | 10/2012 | Kim et al. | 455/118 |
| 8,472,890 B2 * | 6/2013 | Zhuo et al. | 455/86 |
| 2003/0159156 A1 | 8/2003 | Fulga et al. | |
| 2003/0194983 A1 | 10/2003 | Hamada et al. | |
| 2009/0239592 A1 | 9/2009 | Deng et al. | |
| 2010/0233983 A1 | 9/2010 | Flatscher et al. | |
| 2011/0281541 A1 | 11/2011 | Borremans | |
| 2012/0027121 A1 | 2/2012 | Gerna et al. | |
| 2012/0082151 A1 | 4/2012 | Liu et al. | |

FOREIGN PATENT DOCUMENTS

| | | |
|---|---|---|
| WO | WO-9726710 A1 | 7/1997 |
| WO | 9831108 A2 | 7/1998 |

OTHER PUBLICATIONS

Partial International Search Report—PCT/US2013/045381—ISA/EPO—Sep. 16, 2013.
International Search Report and Written Opinion—PCT/US2013/045381—ISA/EPO—Nov. 7, 2013.

* cited by examiner

*Primary Examiner* — Blane J Jackson
(74) *Attorney, Agent, or Firm* — Kevin T. Cheatham

(57) ABSTRACT

A method and apparatus for providing an oscillating signal within a transmitter/receiver circuit is described. The transmitter/receiver circuit may include an oscillator that generates an oscillating signal that may be provided to a low power, low gain mixer of the transmitter/receiver circuit along a shorter circuit path that includes low power circuitry, such as low power buffers and low power frequency dividers. The oscillating signal may also be provided to a high power, high gain mixer along a longer circuit path that includes high power circuitry, such as high power buffers and high power frequency dividers. Specifically, the low power circuitry is adapted to consume less power in an ON state than the high power circuitry in an ON state, and the shorter circuit path has a shorter electrical path length than the longer circuit path.

49 Claims, 12 Drawing Sheets

FIG. 2 *(Prior Art)*

LOW POWER LOCAL OSCILLATOR SIGNAL GENERATION

BACKGROUND

1. Field

Various features pertain to local oscillator signal generation, and more particularly, to a system, apparatus, and method for low power local oscillator signal generation for single band and multi-band transceivers.

2. Background

FIG. 1 illustrates a functional block diagram of an integrated circuit (IC) multi-band receiver 100 found in the prior art. In this example, the multi-band receiver 100 is a tri-band receiver (e.g., receives signals in the 850 MHz, 1900 MHz, and 2100 MHz bands) for a mobile device. Band A 110 includes a low noise amplifier (LNA) 112, a high power, high gain mixer 114, and local oscillator signal path circuitry 116. Similarly, Band B 120 and Band C 130 also include LNAs 122, 132, high power, high gain mixers 124, 134, and local oscillator signal path circuitry 126, 136. Bands A 110, B 120, and C 130 may receive radio frequency (RF) input signals $S_{Iz}$ at one or more input terminals of the LNAs 112, 122, 132.

The LNAs 112, 122, 132 amplify (if needed) the RF signals received, and the mixers 114, 124, 134 down-convert the RF signals to baseband (BB) or intermediate frequencies. The receiver 100 also includes a voltage controlled oscillator (VCO) 102 that provides a local oscillating (LO) signal to the mixers 114, 124, 134 for performing down-conversion. FIG. 2 illustrates a functional block diagram of an LO signal path circuitry 200 found in the prior art that may include one or more active buffers 202, 206 and/or a frequency divider 204. The LO signal path circuitry 200 may be representative of the circuitry 116, 126, 136 that supplies the LO signal from the VCO 102 to the mixers 114, 124, 134.

Referring to FIG. 1, the physical location (i.e., placement on chip and routing) of the LNAs 112, 122, 132 are frequently required to be as close as possible to the RF input signal pins (responsible for receiving the RF input signals $S_{Iz}$) of the integrated circuit receiver 100 in order to minimize wire length, and consequently minimize the noise injected onto the received RF signals. For example, the LNAs 112, 122, 132 may be placed (e.g., routed) on the IC receiver 100 close to their respective RF input signal pins. Similarly, the mixers 114, 124, 134 may be placed close to their corresponding LNAs 112, 122, 132. However, due to size and/or cost constraints the receiver 100 may have only one VCO 102. As a result, the VCO 102 may be placed on the IC receiver 100 further away from some bands' mixers than other bands' mixers.

In the illustrated example, the VCO 102 is placed close to Band A's mixer 114, but further away from Band B and Band C's mixers 124, 134. The longer circuit path from the VCO 102 to Band B 120 and Band C 130 means that Band B's LO signal path circuitry 126 and Band C's LO signal path circuitry 136 may need to consume more power to propagate the LO signal from the VCO 102 to Band B 120 and Band C's 130 respective mixers 124, 134. For example, Band B and Band C's LO Path circuitry 126, 136 may need buffers 202, 206 and/or frequency divider(s) 204 that are scaled to be larger than the buffers and/or frequency divider(s) of Band A's LO Path circuitry 116 in order to properly supply the LO signal from the VCO 102 to the mixers 124, 134. Larger and/or additional buffers and frequency dividers results in increased current and power consumption.

In effect, prior art transceivers undesirably consume significant power in order to propagate LO signals from a VCO to certain on-chip mixers that are placed further away from the VCO than other mixers. Therefore, there is a need for reducing power consumption associated with providing mixers an LO signal where the mixers are placed relatively far from an IC transceiver's VCO.

SUMMARY

One feature provides for a method for providing an oscillating signal within a receiver circuit (e.g., an integrated circuit, etc.), where the method comprises generating the oscillating signal at an oscillator of the receiver circuit, determining if a data signal has a power level greater than, equal to, or less than a predefined threshold value, activating a first mixer and a first circuitry if the power level is greater than the predefined threshold value, wherein the first mixer is electrically coupled to the oscillator along a first path having the first circuitry, the first path having a first electrical path length, providing the oscillating signal to the first mixer via the first path and down-converting the data signal using the first mixer if the power level is greater than the predefined threshold value, activating a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length, and providing the oscillating signal to the second mixer via the second path and down-converting the data signal using the second mixer if the power level is equal to or less than the predefined threshold value. According to one aspect of the disclosure, the first circuitry is adapted to consume less power in a power ON state than the second circuitry in a power ON state. According to another aspect of the disclosure, the method further comprises deactivating the first mixer and the first circuitry if the data signal has a power level equal to or less than the predefined threshold value, and deactivating the second mixer and the second circuitry if the data signal has a power level greater than the predefined threshold value.

According to one aspect of the disclosure, circuit components of the first circuitry are scaled smaller than circuit components of the second circuitry. According to another aspect of the disclosure, the circuit components of the first circuitry includes at least one of a first pre-divider buffer, a first frequency divider, and/or a first post-divider buffer, and the circuit components of the second circuitry includes at least one of a second pre-divider buffer, a second frequency divider, and/or a second post-divider buffer. According to one aspect of the disclosure the first mixer is adapted to consume less power in an ON state than the second mixer in an ON state. According to another aspect of the disclosure, the first mixer is scaled smaller than the second mixer. According to yet another aspect of the disclosure, the receiver circuit is a multi-band receiver. According to another aspect of the disclosure, the first mixer is placed on the receiver circuit closer to the oscillator than the second mixer is to the oscillator. According to yet another aspect of the disclosure, the first electrical path length is less than half of the second electrical path length. According to one aspect, the first electrical path length is less than ten percent (10%) of the second electrical path length. According to another aspect, the method further comprises receiving the data signal at an amplifier of the receiver circuit, wherein the data signal received is a radio frequency (RF) signal. According to yet another aspect, the second mixer is placed on the receiver circuit closer to the amplifier than the first mixer is to the amplifier. According to another aspect of the disclosure, a third electrical path length between the second mixer and the amplifier is less than half of a fourth electrical path length between the first mixer and the amplifier.

Another feature provides a receiver circuit that comprises an oscillator adapted to generate an oscillating signal, and a processing circuit communicatively coupled to the oscillator, the processing circuit adapted to determine if a data signal has a power level greater than, equal to, or less than a predefined threshold value, activate a first mixer and a first circuitry if the power level is greater than the predefined threshold value, wherein the first mixer is electrically coupled to the oscillator along a first path having the first circuitry, the first path having a first electrical path length, provide the oscillating signal to the first mixer via the first path and down-convert the data signal using the first mixer if the power level is greater than the predefined threshold value, activate a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length, and provide the oscillating signal to the second mixer via the second path and down-convert the data signal using the second mixer if the power level is equal to or less than the predefined threshold value. According to one aspect of the disclosure, the processing circuit is further adapted to deactivate the first mixer and the first circuitry if the data signal has a power level equal to or less than the predefined threshold value, and deactivate the second mixer and the second circuitry if the data signal has a power level greater than the predefined threshold value.

Another feature provides a receiver circuit that comprises a means for generating an oscillating signal, a means for determining if a data signal has a power level greater than, equal to, or less than a predefined threshold value, a means for activating a first mixer and a first circuitry if the power level is greater than the predefined threshold value, wherein the first mixer is electrically coupled to the oscillator along a first path having the first circuitry, the first path having a first electrical path length, a means for providing the oscillating signal to the first mixer via the first path and down-converting the data signal using the first mixer if the power level is greater than the predefined threshold value, a means for activating a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length, and a means for providing the oscillating signal to the second mixer via the second path and down-converting the data signal using the second mixer if the power level is equal to or less than the predefined threshold value. According to one aspect of the disclosure, the receiver circuit further comprises a means for deactivating the first mixer and the first circuitry if the data signal has a power level equal to or less than the predefined threshold value, and a means for deactivating the second mixer and the second circuitry if the data signal has a power level greater than the predefined threshold value.

Another feature provides a non-transitory processor-readable medium having instructions stored thereon for providing an oscillating signal within a receiver circuit, which when executed by at least one processor causes the processor to generate the oscillating signal, determine if a data signal has a power level greater than, equal to, or less than a predefined threshold value, activate a first mixer and a first circuitry if the power level is greater than the predefined threshold value, wherein the first mixer is electrically coupled to the oscillator along a first path having the first circuitry, the first path having a first electrical path length, provide the oscillating signal to the first mixer via the first path and down-convert the data signal using the first mixer if the power level is greater than the predefined threshold value, activate a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length, and provide the oscillating signal to the second mixer via the second path and down-convert the data signal using the second mixer if the power level is equal to or less than the predefined threshold value. According to one aspect, the instructions which when executed by the processor further causes the processor to deactivate the first mixer and the first circuitry if the data signal has a power level equal to or less than the predefined threshold value, and deactivate the second mixer and the second circuitry if the data signal has a power level greater than the predefined threshold value.

Another feature provides a method for providing an oscillating signal within an transmitter circuit (e.g., integrated circuit), where the method comprises generating the oscillating signal at an oscillator of the transmitter circuit, determining if a data signal has a power level greater than, equal to, or less than a predefined threshold value, activating a first mixer and a first circuitry if the power level is less than the predefined threshold value, wherein the first mixer is electrically coupled to the oscillator along a first path having the first circuitry, the first path having a first electrical path length, providing the oscillating signal to the first mixer via the first path and up-converting the data signal using the first mixer if the power level is less than the predefined threshold value, activating a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length, and providing the oscillating signal to the second mixer via the second path and up-converting the data signal using the second mixer if the power level is equal to or greater than the predefined threshold value. According to one aspect of the disclosure, the method further comprises deactivating the first mixer and the first circuitry if the data signal has a power level equal to or greater than the predefined threshold value, and deactivating the second mixer and the second circuitry if the data signal has a power level less than the predefined threshold value. According to another aspect, the transmitter circuit is a multi-band transmitter. According to yet another aspect, the first mixer is placed on the transmitter circuit closer to the oscillator than the second mixer is to the oscillator. According to one aspect, the method further comprises receiving the data signal from a processing circuit of the transmitter circuit, wherein the data signal received is a baseband signal. According to another aspect, the method further comprises providing the up-converted data signal to a transmit amplifier of the transmitter circuit. According to yet another aspect, a third electrical path length between the second mixer and the transmit amplifier is less than half of a fourth electrical path length between the first mixer and the transmit amplifier.

Another feature provides a transmitter circuit that comprises an oscillator adapted to generate an oscillating signal, and a processing circuit communicatively coupled to the oscillator, the processing circuit adapted to determine if a data signal has a power level greater than, equal to, or less than a predefined threshold value, activate a first mixer and a first circuitry if the power level is less than the predefined threshold value, wherein the first mixer is electrically coupled to the oscillator along a first path having the first circuitry, the first path having a first electrical path length, provide the oscillating signal to the first mixer via the first path and up-convert the data signal using the first mixer if the power level is less than the predefined threshold value, activate a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length, and provide the oscillating signal to the second mixer via the second path and up-convert the data signal using the second mixer if the power level is equal to or greater than the predefined threshold value. According to one aspect, the processing circuit is further adapted to deactivate the first mixer and the first circuitry if the data signal has a power level equal to or greater than the predefined threshold value, and deactivate the second mixer and the second circuitry if the data signal has a power level less than the predefined threshold value.

Another feature provides for a transmitter circuit that comprises a means for generating the oscillating signal at an oscillator of the transmitter circuit, a means for determining if a data signal has a power level greater than, equal to, or less than a predefined threshold value, a means for activating a first mixer and a first circuitry if the power level is less than the predefined threshold value, wherein the first mixer is electrically coupled to the oscillator along a first path having the first circuitry, the first path having a first electrical path length, a means for providing the oscillating signal to the first mixer via the first path and up-converting the data signal using the first mixer if the power level is less than the predefined threshold value, a means for activating a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length, a means for providing the oscillating signal to the second mixer via the second path and up-converting the data signal using the second mixer if the power level is equal to or greater than the predefined threshold value. According one aspect of the disclosure, the transmitter circuit further comprises a means for deactivating the first mixer and the first circuitry if the data signal has a power level equal to or greater than the predefined threshold value, and a means for deactivating the second mixer and the second circuitry if the data signal has a power level less than the predefined threshold value.

Another feature provides a non-transitory processor-readable medium having instructions stored thereon for providing an oscillating signal within a transmitter circuit, which when executed by at least one processor causes the processor to generate the oscillating signal at an oscillator of the transmitter circuit, determine if a data signal has a power level greater than, equal to, or less than a predefined threshold value, activate a first mixer and a first circuitry if the power level is less than the predefined threshold value, wherein the first mixer is electrically coupled to the oscillator along a first path having the first circuitry, the first path having a first electrical path length, provide the oscillating signal to the first mixer via the first path and up-converting the data signal using the first mixer if the power level is less than the predefined threshold value, activate a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length, and provide the oscillating signal to the second mixer via the second path and up-converting the data signal using the second mixer if the power level is equal to or greater than the predefined threshold value. According to one aspect, the instructions which when executed by the processor further cause the processor to deactivate the first mixer and the first circuitry if the data signal has a power level equal to or greater than the predefined threshold value, and deactivate the second mixer and the second circuitry if the data signal has a power level less than the predefined threshold value.

DETAILED DESCRIPTION

Figure 1:
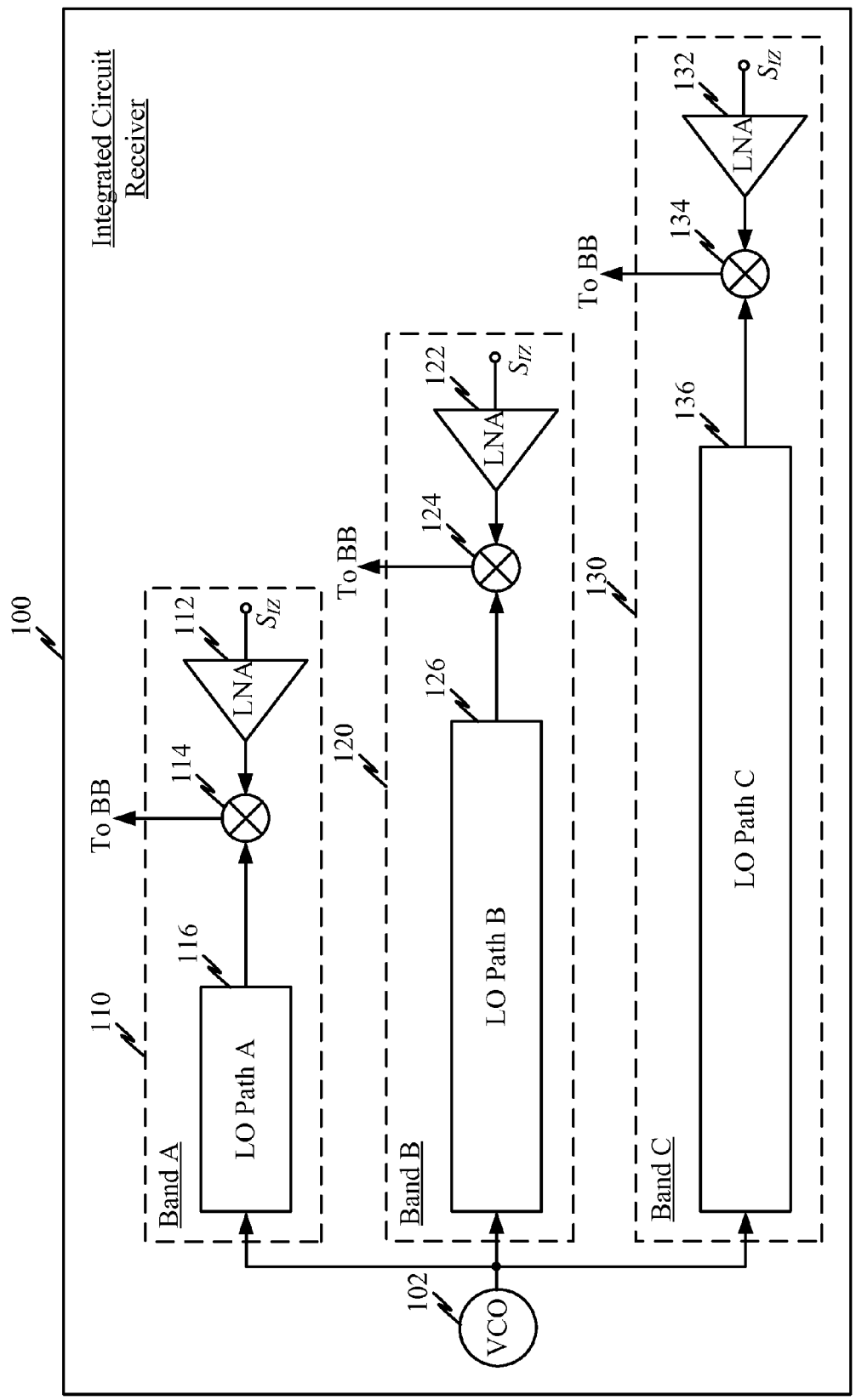
FIG. 1 illustrates a functional block diagram of an integrated circuit (IC) multi-band receiver found in the prior art.
Figure 2:
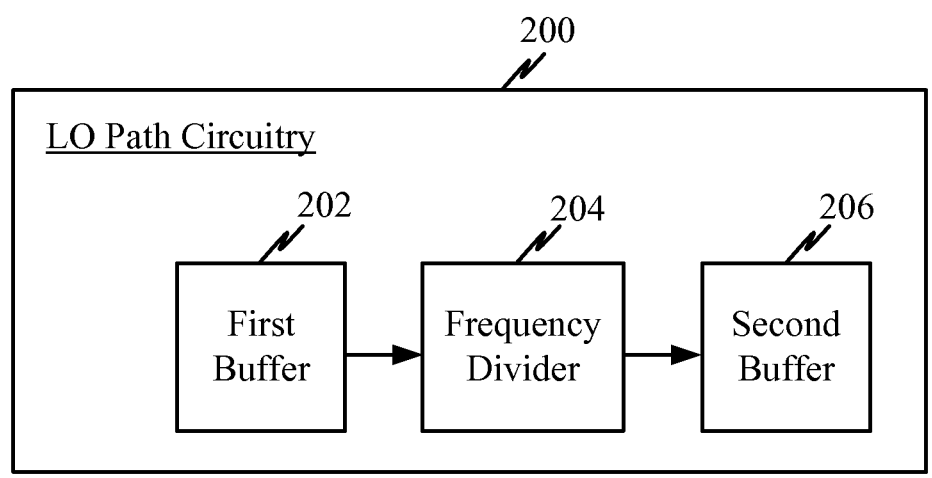
FIG. 2 illustrates a functional block diagram of an LO signal path circuitry found in the prior art that may include one or more active buffers and/or frequency dividers.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The terms "placement" and "place" as used herein refer to physical location of a circuit component (for example, a mixer, an LNA, a buffer, a divider, a VCO, etc.) on an integrated circuit. For example, if a mixer is "placed" relatively close to a VCO then the mixer is routed on-chip such that its electrical path length to the mixer is relatively short.

Overview

A method and apparatus for providing an oscillating signal within a transmitter/receiver circuit is featured. The transmitter/receiver circuit (e.g., integrated circuit) includes an oscillator that generates an oscillating signal that may be provided to a low power, low gain mixer of the transmitter/receiver circuit along a shorter circuit path that includes low power circuitry, such as low power buffers and low power frequency dividers. The oscillating signal may also be provided to a high power, high gain mixer along a longer circuit path that includes high power circuitry, such as high power buffers and high power frequency dividers. Specifically the low power circuitry is adapted to consume less power in an ON state than the high power circuitry in an ON state, and the shorter circuit path has a shorter electrical path length than the longer circuit path.

According to one example, the receiver circuit is an integrated circuit receiver having a processing circuit that activates the low power mixer and the low power circuitry to down-convert an RF data signal if the data signal has a power level greater than a threshold value. Conversely, the processing circuit activates the high power mixer and the high power circuitry to down-convert the RF data signal if the data signal has a power level equal to or less than the threshold value.

According to another example, the transmitter circuit is an integrated circuit transmitter having a processing circuit that activates the low power mixer and the low power circuitry to up-convert a baseband data signal if the data signal has a power level less than a threshold value. Conversely, the processing circuit activates the high power mixer and the high power circuitry to up-convert the baseband data signal if the data signal has a power level equal to or greater than the threshold value.

Figure 3:
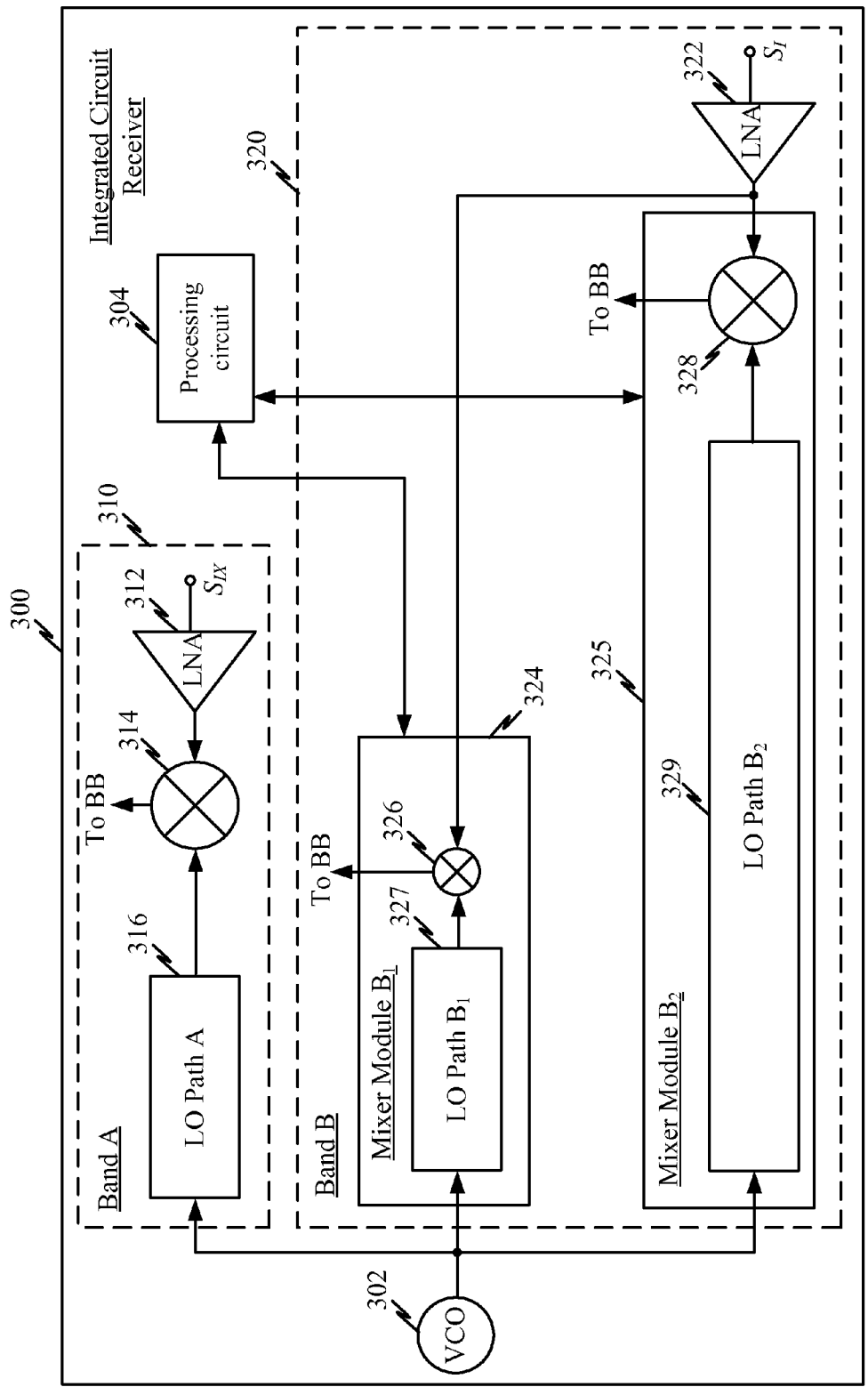
FIG. 3 illustrates a functional block diagram of an integrated circuit (IC) multi-band receiver.

FIG. 3 illustrates a functional block diagram of an integrated circuit (IC) multi-band receiver 300 according to one aspect of the disclosure. In this example, the multi-band receiver 300 is a dual-band receiver (e.g., receives signals in the 850 MHz and 1900 MHz bands). The receiver 300 includes a voltage controlled oscillator (VCO) 302, a processing circuit 304 (e.g., one or more processors), such as a baseband processor, a Band A receiver module 310, and a Band B receiver module 320. In the example illustrated in FIG. 3, the processing circuit 304 is part of the IC receiver 300, however, in other aspects the processing circuit 304 may be an independent integrated circuit communicatively coupled to the IC receiver 300.

The Band A receiver module 310 includes a low noise amplifier (LNA) 312, a high gain mixer 314, and local oscillator (LO) signal path A 316. The Band A receiver module 310 receives radio frequency (RF) input signals $S_{IX}$ within Band A at one or more input terminals of its LNA 312. The LNA 312 amplifies (if needed) the RF signals received, and the high gain mixer 314 down-converts the RF signals to baseband (BB) or an intermediate frequency. The LO signal path A 316 provides the LO signal used for down-conversion from the VCO 302 to the mixer 314. In the illustrated example, Band A's LNA 312 and mixer 314 are placed relatively close to the VCO 302 because Band A's RF signal input pins associated with the LNA 312 are also physically proximate to the VCO 302. As a result, the LO signal path A 316 may include components, such as buffers and frequency dividers, that may be scaled small because less power is needed to drive the LO signal to the mixer 314.

By contrast, the Band B receiver module 320 includes an LNA 322 that is placed substantially further away from the VCO 302 than Band A's LNA 312. For example, Band B's RF signal input pins associated with the LNA 322 may be located far from the VCO 302. The Band B receiver module 320 further includes a mixer module $B_1$ 324 (e.g., a "first mixer module") and a mixer module $B_2$ 325 (e.g., a "second mixer module"). The mixer module $B_1$ 324 includes a relatively low power, low gain mixer 326 (e.g., a "first mixer") that is electrically coupled to the VCO 302 through an LO signal path $B_1$ 327 (e.g., a "first path"). The mixer module $B_2$ 325 includes a relatively high power, high gain mixer 328 (e.g., a "second mixer") that is coupled to the VCO 302 through an LO signal path $B_2$ 329 (e.g., a "second path").

The Band B receiver module 320 receives RF input signals $S_I$ within Band B at one or more input terminals of the LNA 322. The LNA 322 amplifies (if needed) the RF signals received, and the mixers 326, 328 down-convert the RF signals to baseband (BB) or intermediate frequencies. The LO signal path $B_1$ 327 provides the LO signal used for down-conversion from the VCO 302 to the low gain mixer 326, and the LO signal path $B_2$ 329 provides the LO signal used for down-conversion from the VCO 302 to the high gain mixer 328. The processing circuit 304 may transmit one or more control signals to the modules 324, 325 that control the operation of the mixers 326, 328 and the LO signal paths 327, 329.

In the illustrated example, the low gain mixer 326 is placed relatively close to the VCO 302, and the high gain mixer 328 is placed relatively close to the LNA 322, which is relatively far from the VCO 302. Thus, the LO signal must travel a longer path (i.e., LO signal path $B_2$ 329) from the VCO 302 to the high gain mixer 328 than from the VCO 302 to the low gain mixer 326 (i.e., LO signal path $B_1$ 327). As a result, the LO signal path $B_1$ 327 may include circuitry, such as buffers and frequency dividers, that may be scaled small because less power is needed to drive the LO signal to the low gain mixer 326. By contrast, the LO signal path $B_2$ 329 may include circuitry, such as buffers and frequency dividers, that are scaled larger than the components of the LO signal path $B_1$ 327 circuitry because more power is needed to drive the LO signal from the VCO 302 to the high gain mixer 328. To better conceptually illustrate the difference in path length between the VCO 302 and the mixers 326, 328, the LO signal path $B_1$ 327 block in FIG. 3 is shown shorter than the LO signal path $B_2$ 329 block.

Figure 4:
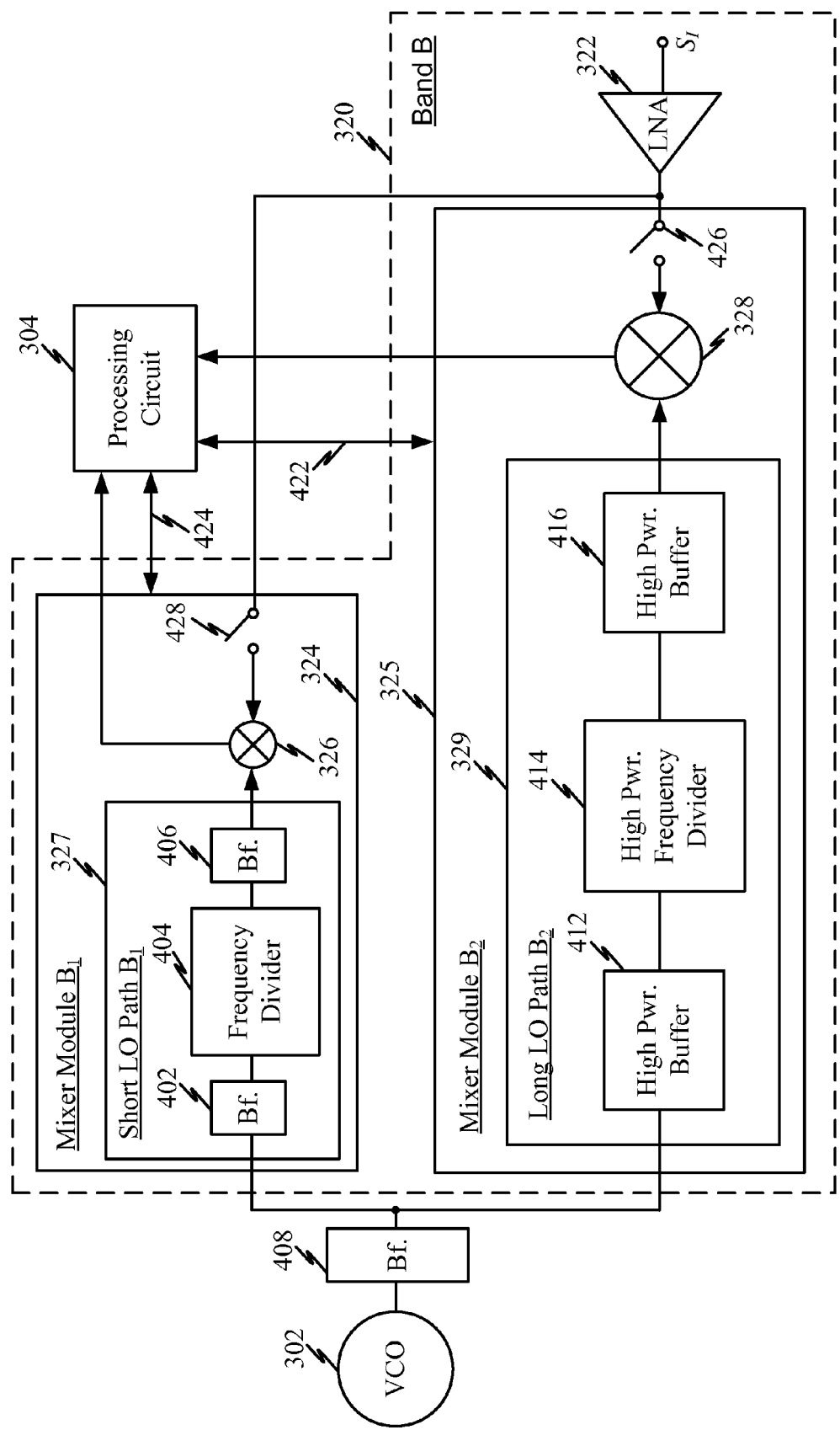
FIG. 4 illustrates a functional block diagram of the Band B receiver module in greater detail.

Referring to FIG. 4, a functional block diagram of the Band B receiver module 320 is illustrated in greater detail according to one aspect of the disclosure. FIG. 4 illustrates the shorter LO signal path $B_1$ 327 that includes, for example, a relatively low power circuitry (e.g., a "first circuitry") comprising a pre-divider buffer 402, a relatively low power frequency divider 404, and/or a relatively low power post-divider buffer 406. The longer LO signal path $B_2$ 329 includes, for example, a relatively high power circuitry (e.g., a "second circuitry") comprising a pre-divider buffer 412, a relatively high power frequency divider 414, and/or a relatively high power post-divider buffer 416. The buffers 402, 406, 412, 416 may be, for example, complementary metal oxide semiconductor (CMOS) inverter buffers that provide driving capability for the signal path, and help increase the signal strength and slew rate. The frequency dividers 404, 414 divide the LO signal frequency generated by the VCO 302 to a desired frequency for use by the mixers 326, 328 for down-conversion. During a power ON state, the high power buffers 412, 416 and the high power divider 414 consume more power than the low power buffers 402, 406, and the low power divider 404, respectively. Similarly, the high gain mixer 328 consumes more current and power in an ON state than the low gain mixer 326 according to one aspect of the disclosure. FIG. 4 also illustrates a VCO buffer 408 that buffers the LO signal between the VCO 302 and the mixer modules $B_1$ and $B_2$ 324, 325. The VCO buffer 408 may amplify the LO signal and provide isolation between the VCO 302 and subsequent stages (e.g., mixer modules $B_1$ and $B_2$ 324, 325).

As discussed above, the low gain mixer 326 is routed relatively close to the VCO 302, while the high gain mixer 328 is routed relatively close to the LNA 322. Therefore, the LO signal generated by the VCO 302 must travel along a longer, more resistive path from the VCO 302 to the high gain mixer 328 than from the VCO 302 to the low gain mixer 326. As a result, the buffers 402, 406 and the frequency divider 404 of the LO signal path $B_1$ 327 may be scaled smaller than the buffers 412, 416 and the frequency divider 414 of the LO signal path $B_2$ 329 because less power is needed to drive the LO signal to the mixer 326 along the shorter LO path $B_1$. To better conceptually illustrate the difference in scaling sizes between the buffers 402, 404, 412, 416 and frequency dividers 404, 414, the low power buffer 402, 406 blocks and the low power frequency divider 404 block are shown smaller than the high power buffer 412, 416 blocks and the high power frequency divider 414 block, respectively.

As will be described in greater detail below, the Band B receiver module 320 illustrated in FIG. 4 may consume substantially less power than prior art IC receiver architectures.

Band B's LNA 322 receives and amplifies (if needed) the RF input signals $S_I$ having frequencies within Band B that are received at one or more input terminals of the LNA 322. During times when the received RF signal power is low (e.g., it is less than a predefined threshold), the processing circuit 304 may transmit one or more control signals 422 that activate and power up (i.e., power ON state) the mixer module $B_2$ 325. Concurrently, the processing circuit 304 may transmit one or more control signals 424 that deactivate and power down (i.e., power OFF state) the mixer module $B_1$ 324. The control signal 422 may power up (i.e., power ON state) the longer LO signal path $B_2$ 329 circuitry, including the buffers 412, 416 and the frequency divider 414, and the high gain mixer 328. The control signal 422 may also activate a switch 426 that provides the received RF signal $S_I$ from the LNA 322 to the high gain mixer 328. Once the mixer module $B_2$ 325 is activated and powered up, the Band B receiver module 320 may utilize the high power, high gain mixer 328 to down-convert the received RF signal $S_I$. Utilizing a high power, high gain mixer 328 to down-convert weak, low power RF signals may be important because it promotes accurate demodulation of the RF signal received in later stages by minimizing signal distortion injected by the mixer during down-conversion.

By contrast, during times when the received RF signal power is high (e.g., it is greater than a predefined threshold), the processing circuit 304 may transmit one or more control signals 424 that activate and power up (i.e., power ON state) the mixer module $B_1$ 324. Concurrently, the processing circuit 304 may transmit one or more control signals 422 that deactivate and power down (i.e., power OFF state) the mixer module $B_2$ 325. The control signal 424 may power up the shorter LO signal path $B_1$ 327 circuitry, including the buffers 402, 406 and the frequency divider 404, and the low gain mixer 326. The control signal 424 may also activate a switch 428 that provides the received RF signal $S_I$ from the LNA 322 to the low gain mixer 326. Once the mixer module $B_1$ 324 is activated and powered up, the Band B receiver module 320 may utilize the low power, low gain mixer 326 to down-convert the RF signal $S_I$. Utilizing a low power, low gain mixer 326 that may inject more noise onto the RF signal $S_I$ than the high gain mixer 328 may still be satisfactory because a slight degradation of the signal quality will not significantly impact accurate demodulation of the received signal in later stages. Specifically, since the received RF signal power is relatively high, a slight distortion of the signal may prove to be inconsequential for accurate data recovery during demodulation.

For example, the Band B receiver module 320 may receive an input RF signal $S_I$ at the LNA 322 having a power level less than a predefined threshold value. In response, the processing circuit 304 transmits a control signal 422 to the mixer module $B_2$ 325 to activate and power ON the longer LO signal path $B_2$ 329 circuitry and the high power, high gain mixer 328. The processing circuit 304 may also transmit a control signal 424 to the mixer module $B_1$ 324 to deactivate and power OFF the shorter LO signal path $B_1$ 327 circuitry and the low power, low gain mixer 326. The control signal 422 may also close the switch 426 so that the received RF signal $S_I$ may be provided to the high gain mixer 328. The high gain mixer 328 receives the RF signal $S_I$ from the LNA 322, and the LO signal from the VCO 302 via the LO signal path $B_2$ 329. The high gain mixer 328 down-converts the received RF signal $S_I$ to, for example, a baseband signal and provides the baseband signal to the processing circuit 304 for additional processing, including demodulation, filtering, etc. According to one aspect, the power level of the received RF signal $S_I$ may be measured by the processing circuit 304 before the processing circuit 304 transmits the control signal 422 to the mixer module $B_2$ 325.

Next, the power level of the input RF signal $S_I$ received at the LNA 322 may increase so that it is greater than the threshold value. In response, the processing circuit 304 transmits a control signal 424 to the mixer module $B_1$ 324 to activate and power ON the shorter LO signal path $B_1$ 327 circuitry and the low power, low gain mixer 326. The processing circuit 304 may also transmit a control signal 422 to the mixer module $B_2$ 325 to deactivate and power OFF the longer LO signal path $B_2$ 329 circuitry and the high power, high gain mixer 328. The control signal 424 may also close the switch 428 so that the received RF signal $S_I$ may be provided to the low gain mixer 326. The low gain mixer 326 receives the RF signal $S_I$ from the LNA 322, and the LO signal from the VCO 302 via the LO signal path $B_1$ 327. The low gain mixer 326 down-converts the received RF signal $S_I$ to, for example, a baseband signal and provides the baseband signal to the processing circuit 304 for additional processing, including demodulation, filtering, etc. By utilizing the low power circuit components, including the buffers 402, 406, divider 404, and low gain mixer 326, the Band B receiver module 320 is able to conserve power.

Thus, the receiver 300 conserves power during times when the power of the RF signal received by the Band B LNA 322 is high because the mixer module $B_1$ 324 components performing the down-conversion, including the buffers 402, 406, frequency divider 404, and low gain mixer 326, consume less current and power than their high power counterparts in mixer module $B_2$ 325. The receiver 300 takes advantage of the low power, low gain mixer 326 when the relatively high input power of the received RF signal does not necessitate the use of the high gain, low noise mixer 328 for down-conversion. Moreover, the receiver 300 conserves power by taking advantage of the close placement of the mixer module $B_1$ 324 components, including the buffers 402, 406, frequency divider 404, and low gain mixer 326, to the VCO 302. As described above, placing/routing the low power, low gain mixer 326 proximate to the VCO 302 allows the LO signal path $B_1$ 327 circuitry, including the buffers 402, 406 and the frequency divider 404, to be scaled significantly smaller (i.e., they consume less current and power) than the LO signal path $B_2$ 329 circuitry since less current drive is necessary to drive the LO signal to the low gain mixer 326. In other aspects of the disclosure, placing/routing the low power, low gain mixer 326 proximate to the VCO 302 allows the LO signal path $B_1$ 327 circuitry to include fewer buffers and/or other circuit components, thereby further reducing power consumption by the LO signal path $B_1$ 327 circuitry.

Consequently, the higher the proportion of time that the Band B receiver module 320 is down-converting RF signals having a power level greater than the predefined threshold required to activate the mixer module $B_1$, the more power the receiver 300 conserves. In certain applications where the receiver 300 is implemented in a mobile device, such as mobile phone, the received RF signal $S_I$ may have a power greater than the predefined threshold a majority of the time (e.g., the mobile device is within close proximity to a base station and receives signals within Band B that are relatively high power), and as a result the receiver 300 conserves significant power by performing down-conversion using the lower power mixer module $B_1$ 324.

Figure 5:
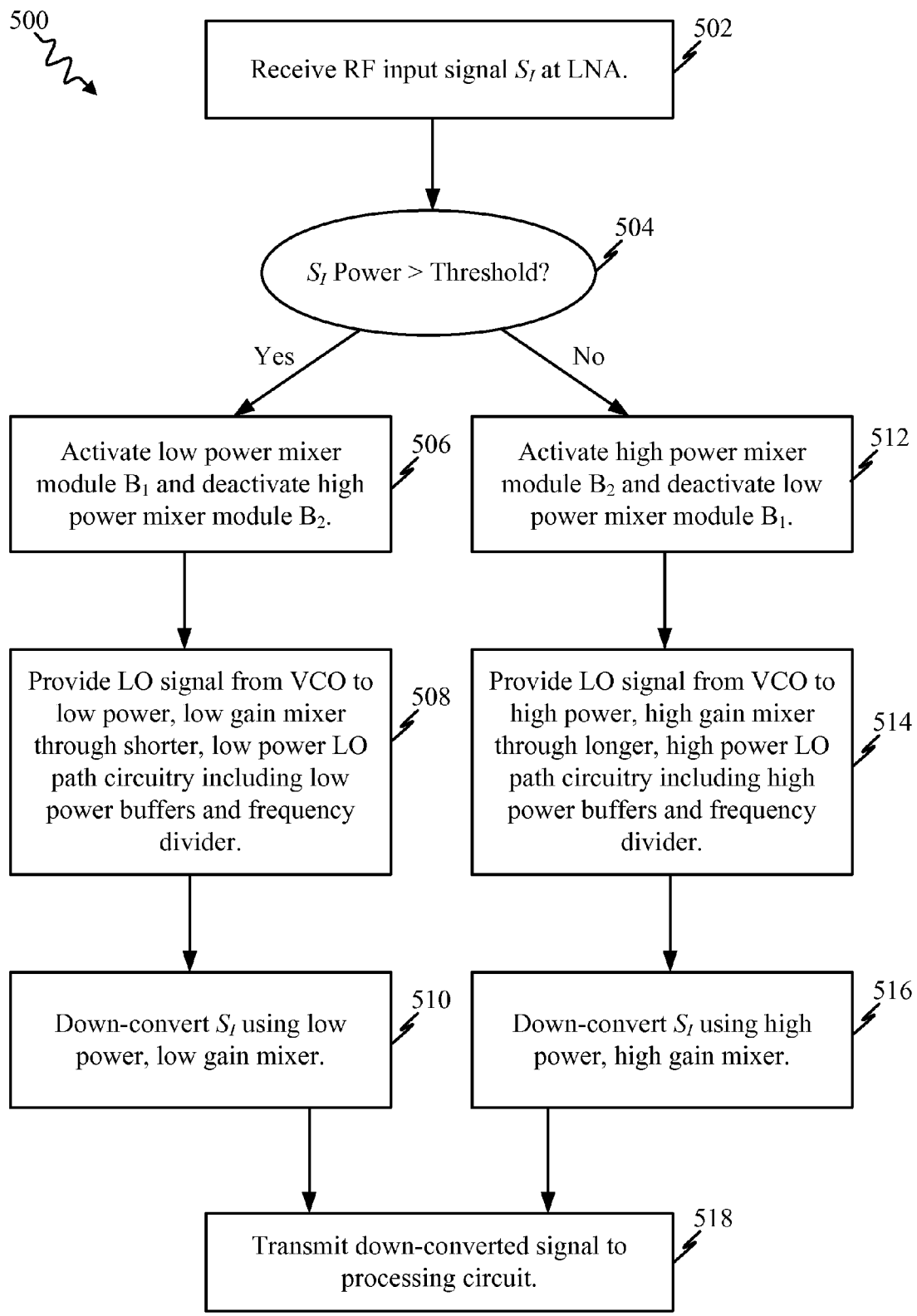
FIG. 5 illustrates a flow chart for providing a low power LO signal for a low power receiver.

FIG. 5 illustrates a flow chart 500 for providing a low power LO signal for a low power receiver according to one aspect of the disclosure. Referring to FIGS. 3-5, at step 502, an RF input signal $S_I$ (e.g., a "data signal") is received at the LNA 322 associated with a band (e.g., Band B) of the low power receiver 300. At step 504, the processing circuit 304 may determine whether the power of the RF input signal $S_I$ is greater than a predefined threshold value. If it is determined that the power of $S_I$ is greater than the predefined threshold value, then at step 506, the low power mixer module $B_1$ 324 is activated and the high power mixer module $B_2$ 325 is deactivated. For example, the processing circuit 304 may transmit a control signal 424 to the low power mixer module $B_1$ 324 that activates the mixer module $B_1$ 324, and another control signal 422 may be transmitted to the high power mixer module $B_2$ 325 that deactivates the mixer module $B_2$ 325. Activating the mixer module $B_1$ 324 may include powering up the LO signal path $B_1$ 327 circuitry that includes the buffers 402, 406 and the frequency divider 404, powering up the low gain mixer 326, and closing the switch 428 to provide the input signal $S_I$ to the low gain mixer 326. Deactivating the mixer module $B_2$ 325 may include powering down the LO signal path $B_2$ 329 circuitry that includes the buffers 412, 416 and the frequency divider 414, powering down the high gain mixer 328, and opening the switch 426 to disconnect the input signal $S_I$ from the high gain mixer 328.

At step 508, the LO signal may be provided from the VCO 302 to the low gain mixer 326 through the short, low power LO signal path $B_1$ 327 and associated circuitry, including the low power buffers 402, 406 and the low power frequency divider 404. At step 510, the low gain mixer 326 down-converts the RF signal $S_I$ to either an intermediate frequency or a baseband signal. At step 518, the down-converted output signal from the low gain mixer 326 is provided to the processing circuit 304.

If, however, it is determined at step 504 that the power of $S_I$ is less than or equal to the predefined threshold value, then at step 512, the high power mixer module $B_2$ 325 is activated and the low power mixer module $B_1$ 324 is deactivated. For example, the processing circuit 304 may transmit a control signal 422 to the high power mixer module $B_2$ 325 that activates the mixer module $B_2$ 325, and another control signal 424 may be transmitted to the low power mixer module $B_1$ 324 that deactivates the mixer module $B_1$ 324. Activating the mixer module $B_2$ 325 may include powering up the LO signal path $B_2$ 329 circuitry that includes the buffers 412, 416 and the frequency divider 414, powering up the high gain mixer 328, and closing the switch 426 to provide the input signal $S_I$ to the high gain mixer 328. Deactivating the mixer module $B_1$ 324 may include powering down the LO signal path $B_1$ 327 circuitry that includes the buffers 402, 406 and the frequency divider 404, powering down the low gain mixer 326, and opening the switch 428 to disconnect the input signal $S_I$ from the low gain mixer 326.

At step 514, the LO signal may be provided from the VCO 302 to the high gain mixer 328 through the long, high power LO signal path $B_2$ 329 and associated circuitry, including the high power buffers 412, 416 and the high power frequency divider 414. At step 516, the high gain mixer 328 down-converts the RF signal $S_I$ to either an intermediate frequency or a baseband signal. At step 518, the down-converted output signal from the high gain mixer 328 is provided to the processing circuit 304.

Figure 6:
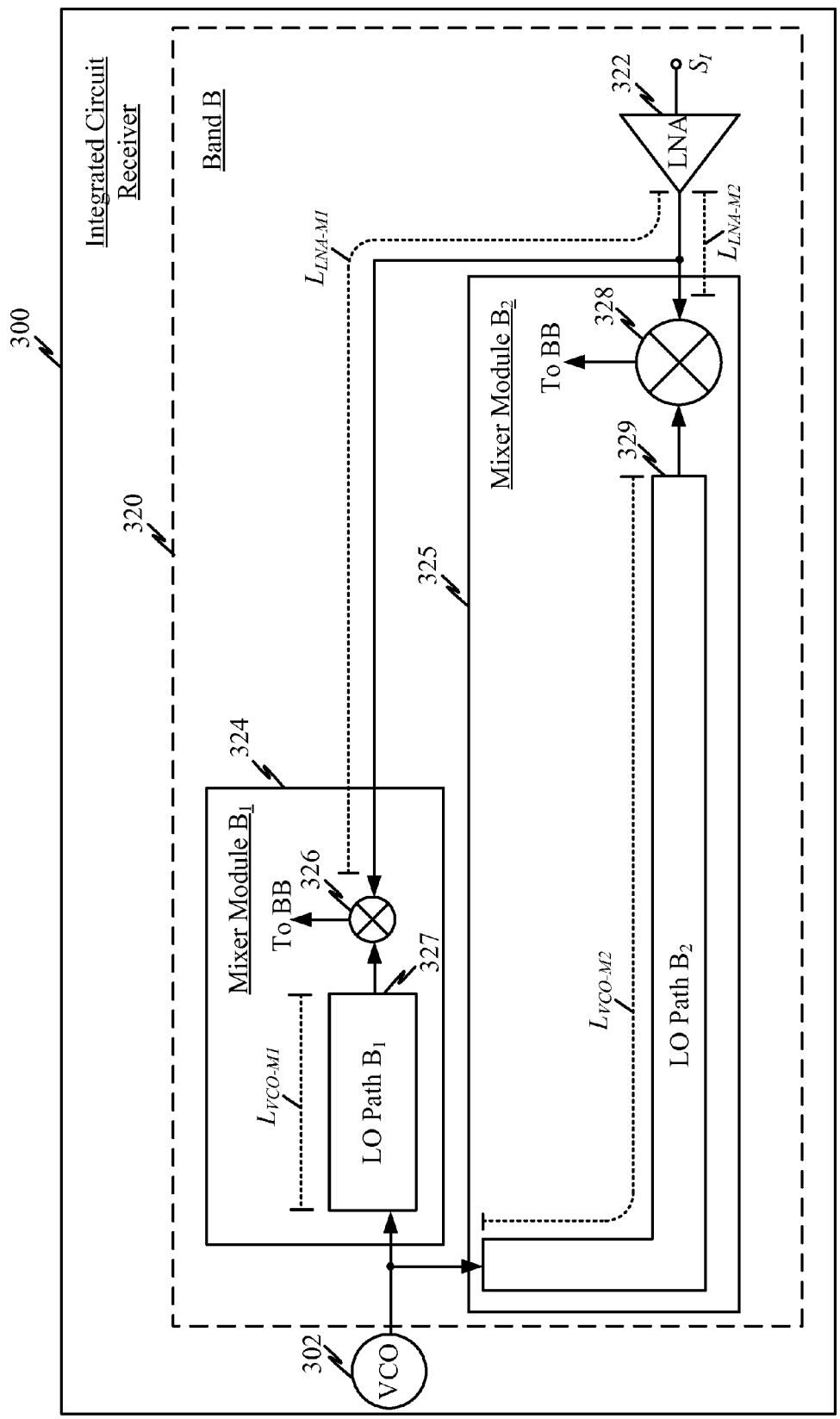
FIG. 6 illustrates a functional block diagram of an integrated circuit receiver that includes a low power receiver module.

FIG. 6 illustrates a functional block diagram of the integrated circuit receiver 300 that includes a low power band B receiver module 320 according to one aspect of the disclosure. As shown in the illustrated example, the path length $L_{VCO-M1}$ (e.g., a "first electrical path length") defines the on-chip electrical path length (e.g., routing length of the first path) between the VCO 302 and the low gain mixer 326. Thus, the electrical path length $L_{VCO-M1}$ has a direct effect on the resistance, capacitance, and signal loss experienced by the LO signal being provided/distributed from the VCO 302 to the low gain mixer 326. Similarly, the path length $L_{VCO-M2}$ (e.g., a "second electrical path length") defines the on-chip electrical path length (e.g., routing length of the second path) between the VCO 302 and the high gain mixer 328. Thus, the electrical path length $L_{VCO-M2}$ has a direct effect on the resistance, capacitance, and signal loss experienced by the LO signal being provided/distributed from the VCO 302 to the high gain mixer 328. FIG. 6 clearly shows that the electrical path length $L_{VCO-M1}$ is shorter than the electrical path length $L_{VCO-M2}$, and therefore the LO signal path $B_2$ circuitry 329 may require larger circuit components (e.g., buffers, dividers, etc.) to drive the LO signal from the VCO 302 to the high gain mixer 328.

In one aspect of the disclosure, the path length $L_{VCO-M1}$ is between 1% and 10% of the path length $L_{VCO-M2}$. In another aspect of the disclosure, the path length $L_{VCO-M1}$ is between 10% and 25% of the path length $L_{VCO-M2}$. In yet another aspect of the disclosure, the path length $L_{VCO-M1}$ is between 25% and 50% of the path length $L_{VCO-M2}$. In yet another aspect of the disclosure, the path length $L_{VCO-M1}$ is between 50% and 75% of the path length $L_{VCO-M2}$. In yet another aspect of the disclosure, the path length $L_{VCO-M1}$ is between 75% and 99% of the path length $L_{VCO-M2}$. As just one example, the path length $L_{VCO-M1}$ may be equal to or less than 200 microns and/or the path length $L_{VCO-M2}$ may be greater than or equal to 2,000 microns. As another example, the path length $L_{VCO-M1}$ may be equal to or less than 500 microns and/or the path length $L_{VCO-M2}$ may be greater than or equal to 1,000 microns.

As shown in the illustrated example, the path length $L_{LNA-M1}$ (e.g., a "third electrical path length") defines the on-chip electrical path length (e.g., length of routing) between the LNA 322 and the low gain mixer 326. Similarly, the path length $L_{LNA-M2}$ (e.g., a "fourth electrical path length") defines the on-chip electrical path length (e.g., length of routing) between the LNA 322 and the high gain mixer 328. FIG. 6 shows that the electrical path length $L_{LNA-M1}$ is longer than the electrical path length $L_{LNA-M2}$.

In one aspect of the disclosure, the path length $L_{LNA-M2}$ is between 1% and 10% of the path length $L_{LNA-M1}$. In another aspect of the disclosure, the path length $L_{LNA-M2}$ is between 10% and 25% of the path length $L_{LNA-M1}$. In yet another aspect of the disclosure, the path length $L_{LNA-M2}$ is between 25% and 50% of the path length $L_{LNA-M1}$. In yet another aspect of the disclosure, the path length $L_{LNA-M2}$ is between 50% and 75% of the path length $L_{LNA-M1}$. In yet another aspect of the disclosure, the path length $L_{LNA-M2}$ is between 75% and 99% of the path length $L_{LNA-M1}$. As just one example, the path length $L_{LNA-M2}$ may be equal to or less than 200 microns and/or the path length $L_{LNA-M1}$ may be greater than or equal to 2,000 microns. As another example, the path length $L_{LNA-M2}$ may be equal to or less than 500 microns and/or the path length $L_{LNA-M1}$ may be greater than or equal to 1,000 microns.

Referring to FIGS. 4 and 6, in one aspect of the disclosure, the LO path $B_1$ 327 circuitry may be scaled such that it is less than 34% the size (e.g., transistor width, driving capability, etc.) of the LO path $B_2$ 329 circuitry. For example, one or more components of the LO path $B_1$ 327 circuitry, including the pre-divider buffer 402, frequency divider 404, and/or post-divider buffer 406, may be scaled such that they are less than 34% the size (e.g., transistor width, driving capability, etc.) of corresponding components in the LO path $B_2$ 329 circuitry (e.g., pre-divider buffer 412, frequency divider 414, and/or post-divider buffer 416). In another aspect of the disclosure, the LO path $B_1$ 327 circuitry may be scaled such that it is between 34% and 67% of the size of the LO path $B_2$ 329 circuitry. For example, one or more components of the LO path $B_1$ 327 circuitry, including the pre-divider buffer 402, frequency divider 404, and/or post-divider buffer 406, may be scaled such that they are between 34% and 67% of the size of corresponding components in the LO path $B_2$ 329 circuitry (e.g., pre-divider buffer 412, frequency divider 414, and/or post-divider buffer 416). In yet another aspect of the disclosure, the LO path $B_1$ 327 circuitry may be scaled such that it is between 67% and 95% of the size of the LO path $B_2$ 329 circuitry. For example, one or more components of the LO path $B_1$ 327 circuitry, including the pre-divider buffer 402, frequency divider 404, and/or post-divider buffer 406 may be scaled such that they are between 67% and 95% of the size of corresponding components in the LO path $B_2$ 329 circuitry (e.g., pre-divider buffer 412, frequency divider 414, and/or post-divider buffer 416).

In another aspect of the disclosure, the low gain, low power mixer 326 may be scaled such that it is less than 34% of the size (e.g., transistor width, driving capability, etc.) of the high power, high gain mixer 328. In another aspect of the disclosure, the low gain, low power mixer 326 may be scaled such that it is between 34% and 67% of the size of the high power, high gain mixer 328. In another aspect of the disclosure, the low gain, low power mixer 326 may be scaled such that it is between 67% and 95% of the size of the high power, high gain mixer 328. In another aspect of the disclosure, the diversity buffer 408 may also be scaled down in size to match the ratio between the low gain mixer 326 and the high gain mixer 328. That is, if the low gain mixer 326 is scaled down to 33% of the size of the high gain mixer 328, then the diversity buffer 408 may be scaled down to 33% of its original size (e.g., the original size being the size of the diversity buffer used in an aspect of the receiver not featuring mixer module $B_1$). In another aspect of the disclosure, the diversity buffer 408 may be scaled down in size to match the ratio between the LO signal path $B_1$ 327 circuitry and the LO signal path $B_2$ 329 circuitry. That is, if the LO signal path $B_1$ 327 circuitry is scaled down to 33% of the size of the LO signal path $B_2$ 329 circuitry, then the diversity buffer 408 may be scaled down to 33% of its original size (e.g., the original size being the size of the diversity buffer used in an aspect of the receiver not featuring mixer module $B_1$). In other aspects, the diversity buffer 408 may be scaled down by different amounts.

According to one aspect, the high power pre-divider buffer 412, high power frequency divider 414, the high power post-divider buffer 416, and the high power, high gain mixer 328 may each be scaled such that they are four (4) times larger (transistor width, driving capability, etc.) than their corresponding low power counterparts: the pre-divider buffer 402, frequency divider 404, the post-divider buffer 406, and the low power, low gain mixer 326.

Figure 7:
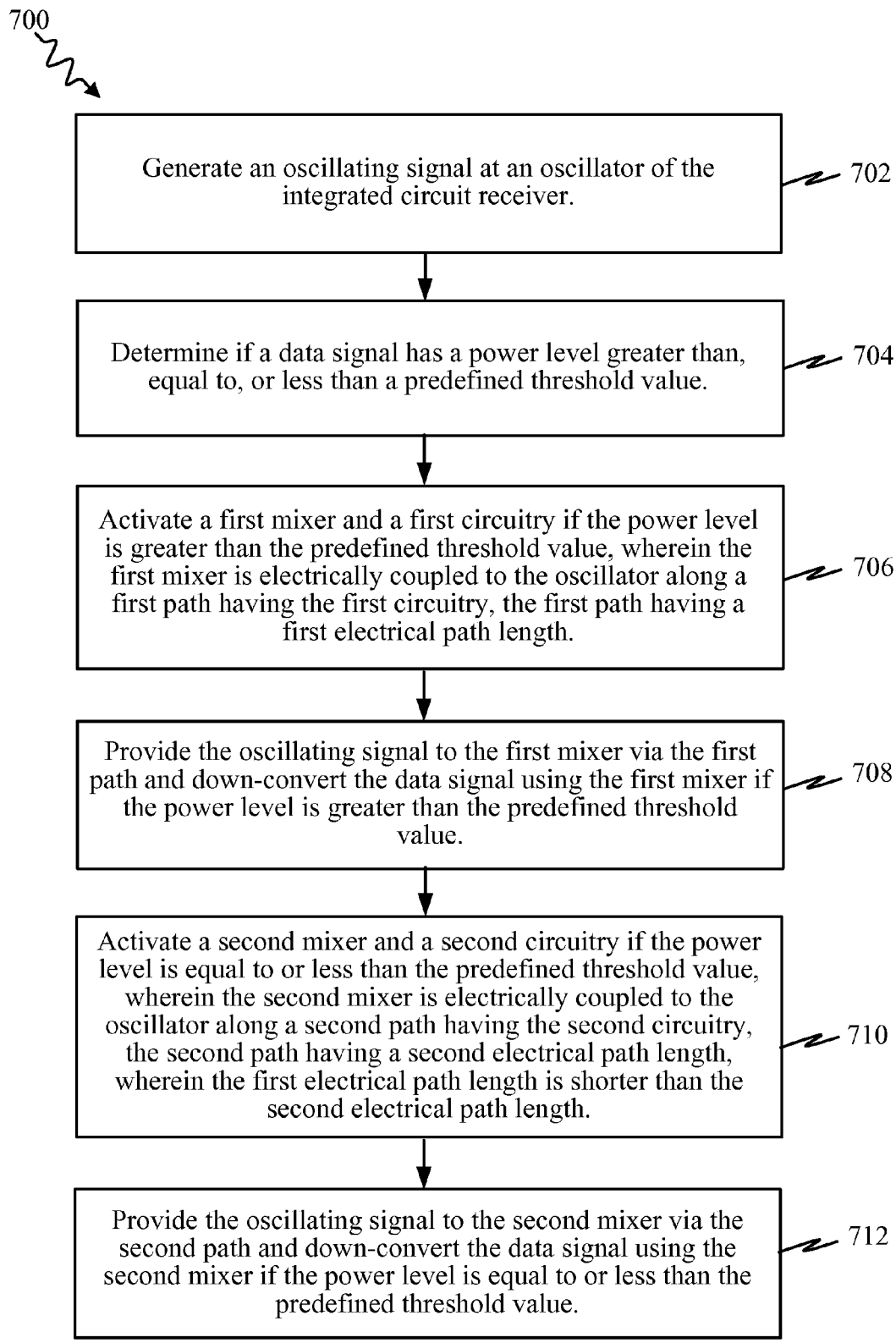
FIG. 7 illustrates a flow chart for a low power method for providing an oscillating signal within an integrated circuit receiver.

FIG. 7 illustrates a flow chart 700 for a low power method for providing an oscillating signal within an integrated circuit receiver according to one aspect of the disclosure. At step 702, an oscillating signal is generated at an oscillator of the integrated circuit receiver. At step 704, it is determined if a data signal has a power level greater than, equal to, or less than a predefined threshold value. At step 706, a first mixer and a first circuitry are activated if the power level is greater than the predefined threshold value, wherein the first mixer is electrically coupled to the oscillator along a first path having the first circuitry, and the first path has a first electrical path length. At step 708, the oscillating signal is provided to the first mixer via the first path and the data signal is down-converted using the first mixer if the power level is greater than the predefined threshold value. At step 710, a second mixer and a second circuitry are activated if the power level is equal to or less than the predefined threshold value, wherein the second mixer is electrically coupled to the oscillator along a second path having the second circuitry, and the second path has a second electrical path length. Moreover, the first electrical path length is shorter than the second electrical path length. At step 712, the oscillating signal is provided to the second mixer via the second path and the data signal is down-converted using the second mixer if the power level is equal to or less than the predefined threshold value. In at least one aspect of the disclosure, activating the first mixer, the first circuitry, the second mixer, and/or the second circuitry includes powering up the first mixer, the first circuitry, the second mixer, and/or the second circuitry to a power ON state. In at least one aspect of the disclosure, deactivating the first mixer, the first circuitry, the second mixer, and/or the second circuitry includes powering down the first mixer, the first circuitry, the second mixer, and/or the second circuitry to a power OFF state.

The power saving techniques described above with respect to integrated circuit receivers, such as the receiver 300 shown in FIG. 3, may equally be applied to integrated circuit transmitters.

Figure 8:
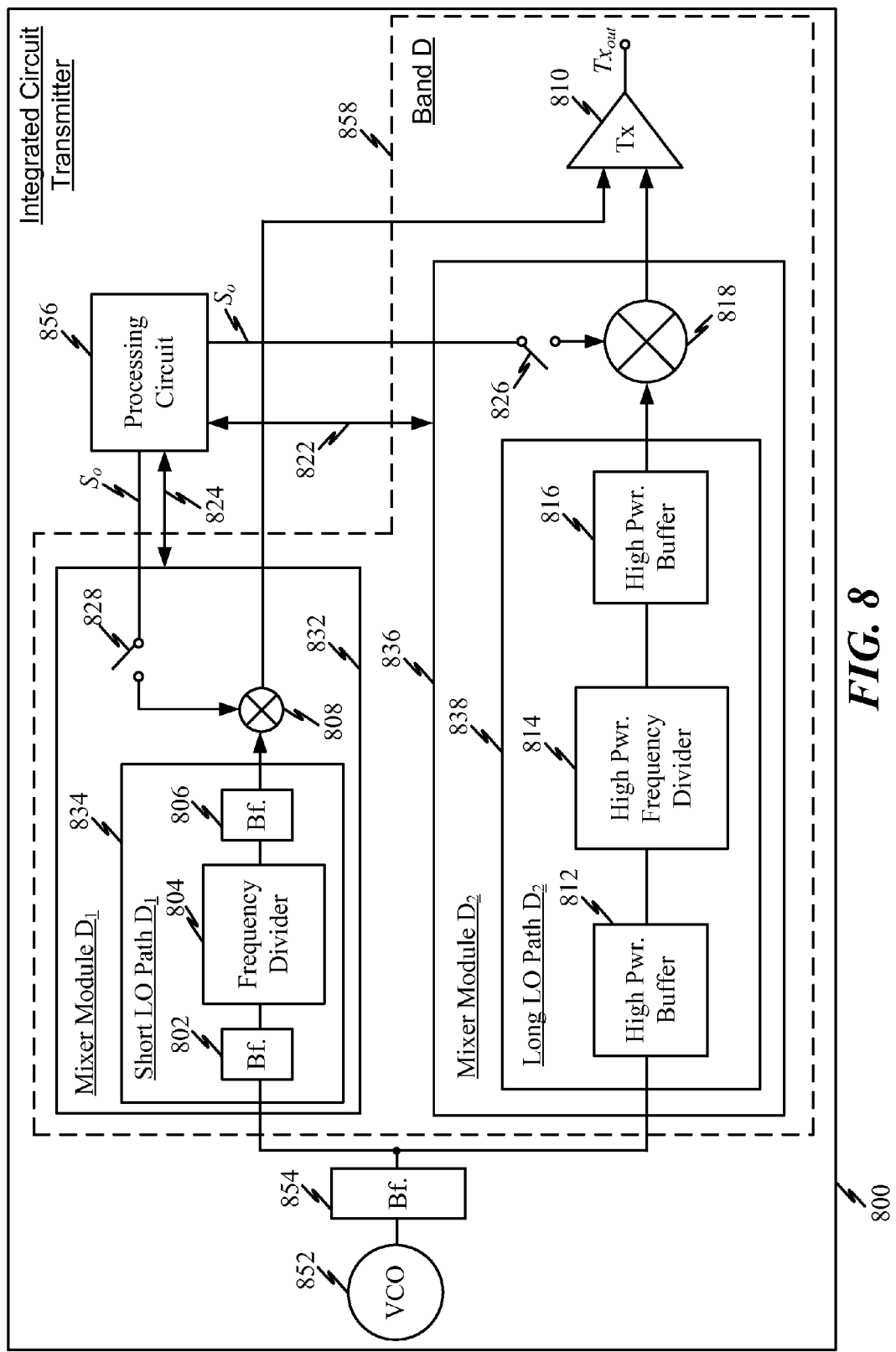
FIG. 8 illustrates a functional block diagram of an integrated circuit transmitter.

FIG. 8 illustrates a functional block diagram of an integrated circuit transmitter 800 according to one aspect of the disclosure. The transmitter 800 may include a VCO 852, a VCO buffer 854, a processing circuit 856, and a Band D transmitter module 858. The Band D transmitter module 858 includes a mixer module $D_1$ 832, a mixer module $D_2$ 836, and a transmit amplifier 810 for transmitting output RF signals ($Tx_{out}$). In the illustrated example, Band D's transmit amplifier 810 is placed relatively far away from the VCO 852. For example, the transmitter 800 may include other transmit amplifiers (not shown) associated with other bands that may be placed closer to the VCO 852 than Band D's transmit amplifier 810.

Band D's mixer module $D_1$ 832 includes a relatively low power, low gain mixer 808 (e.g., a "first mixer") that is electrically coupled to the VCO 852 through a short LO signal path $D_1$ 834 (e.g., a "first path"). The mixer module $D_2$ 836 includes a relatively high power, high gain mixer 818 (e.g., a "second mixer") that is electrically coupled to the VCO 852 through a long LO signal path $D_2$ 838 (e.g., a "second path").

The Band D transmitter module 858 transmits radio frequency (RF) output signals $Tx_{out}$ within Band D at one or more output terminals of the transmit amplifier 810. The mixers 808, 818 up-convert baseband (BB) or intermediate frequency (IF) signals (e.g., baseband signal $S_O$ provided by the processing circuit 856) to RF signals, and the transmit amplifier 810 amplifies the RF signals for transmission. The short LO signal path $D_1$ 834 provides the LO signal used for up-conversion from the VCO 852 to the low gain mixer 808, and the long LO signal path $D_2$ circuitry 838 the LO signal used for up-conversion from the VCO 852 to the high gain mixer 818. The processing circuit 856 may transmit one or more control signals 822, 824 to the modules 832, 836 that control the operation of the mixers 808, 818 and the LO signal paths 834, 838.

The short LO signal path $D_1$ 834 includes, for example, a relatively low power circuitry (e.g., a "first circuitry") comprising a pre-divider buffer 802, a relatively low power frequency divider 804, and/or a relatively low power post-divider buffer 806. The long LO signal path $D_2$ 838 includes, for example, a relatively high power circuitry (e.g., a "second circuitry") comprising a pre-divider buffer 812, a relatively high power frequency divider 814, and/or a relatively high power post-divider buffer 816. The buffers 802, 806, 812, 816 may be, for example, complementary metal oxide semiconductor (CMOS) inverter buffers that provide driving capability for the LO signal path and help increase the signal strength and slew rate. The frequency dividers 804, 814 divide the LO signal frequency generated by the VCO 852 to a desired frequency for use by the mixers 808, 818 for up-conversion. During a power ON state, the high power buffers 812, 816 and the high power divider 814 consume more power than the low power buffers 802, 806, and the low power divider 804, respectively. Similarly, the high gain mixer 818 may consume more current and power in a power ON state than the low gain mixer 808 according to one aspect of the disclosure. FIG. 8 also illustrates a VCO buffer 854 that buffers the LO signal between the VCO 852 and the mixer modules $D_1$ and $D_2$ 832, 836. The VCO buffer 854 may amplify the LO signal and provide isolation between the VCO 852 and subsequent stages (e.g., mixer modules $D_1$ and $D_2$ 832, 836).

In the illustrated example, the low gain mixer 808 is placed relatively close to the VCO 852, and the high gain mixer 818 is placed relatively close to the transmit amplifier 810, which is relatively far from the VCO 852. Thus, the LO signal must travel a longer, more resistive path from the VCO 852 to the high gain mixer 818 than from the VCO 852 to the low gain mixer 808, which is a shorter, less resistive path. As a result, the LO signal path $D_1$ 834 circuitry, such as the buffers 802, 806 and the frequency divider 804, may be scaled small because less power is needed to drive the LO signal to the low gain mixer 808. By contrast, the LO signal path $D_2$ 838 circuitry, such as the buffers 812, 816 and the frequency divider 814, may be scaled larger than the components of the LO signal path $D_1$ 834 because more power is needed to drive the LO signal from the VCO 852 to the high gain mixer 818. To better conceptually illustrate the difference in path length between the VCO 852 and the mixers 808, 818 and scaling size differences between the buffers 802, 804, 812, 816 and frequency dividers 804, 814, the LO signal path $D_1$ 834 block in FIG. 8 is shown shorter than the LO signal path $D_2$ 838 block, and the low power buffer 802, 806 blocks and the low power frequency divider 804 block are shown smaller than the high power buffer 812, 816 blocks and the high power frequency divider 814 block.

As will be described in greater detail below, the Band D transmitter module 858 illustrated in FIG. 8 may consume substantially less power than prior art IC transmitter architectures.

According to one example, the processing circuit 856 generates baseband signals $S_O$ that are to be up-converted to RF and transmitted to one or more receiving stations (not shown). In some cases, the output RF signals to be transmitted may be low power signals intended for receiving stations located along a relatively low signal loss path from the transmitter 800 to the receiving stations (e.g., the receiving stations are relatively close to the transmitter 800 and/or the path suffers from relatively low interference). In other cases, the RF signals to be transmitted may be high power signals intended for receiving stations located along a relatively high signal loss path from the transmitter 800 to the receiving stations (e.g., the receiving stations are relatively far to the transmitter 800 and/or the path suffers from relatively high interference).

During times when the baseband signal $S_O$ power level is low (e.g., it is below a predefined threshold), the processing circuit 856 may transmit one or more control signals 824 that activate and power up (i.e., power ON state) the mixer module $D_1$ 832. Concurrently, the processing circuit 856 may transmit one or more control signals 822 that deactivate and power down (i.e., power OFF state) the mixer module $D_2$ 836. The control signal 824 may power up (i.e., power ON state) the short LO signal path $D_1$ 834 circuitry, including the buffers 802, 806 and the frequency divider 804, and the low gain mixer 808. The control signal 824 may also activate a switch 828 that provides the baseband signal $S_O$ to be up-converted from the processing circuit 856 to the low gain mixer 808. Once the mixer module $D_1$ 832 is activated and powered up, the Band D transmitter module 856 may utilize the low power, low gain mixer 808 to up-convert the baseband signal $S_O$. Utilizing a low power, low gain mixer 808 to up-convert RF signals that will be transmitted at low power levels saves power. In some cases, the low power, low gain mixer 808 may inject more noise onto the output RF signal $Tx_{out}$ than the high power, high gain mixer 818. However, any additional noise injected onto the RF signal $Tx_{out}$ by the low gain mixer 808 may still be satisfactory because a slight degradation of the signal quality will not significantly impact accurate demodulation of the RF signal $Tx_{out}$ by the receiving stations that are located along low loss paths of the output RF signal $Tx_{out}$.

By contrast, during times when the baseband signal $S_O$ power level is high (e.g., it is above a predefined threshold), the processing circuit 856 may transmit one or more control signals 822 that activate and power up (i.e., power ON state) the mixer module $D_2$ 836. Concurrently, the processing circuit 856 may transmit one or more control signals 824 that deactivate and power down (i.e., power OFF state) the mixer module $D_1$ 832. The control signal 822 may power up the long LO signal path $D_2$ 838 circuitry, including the buffers 812, 816 and the frequency divider 814, and the high gain mixer 818. The control signal 822 may also activate a switch 826 that provides the baseband signal $S_O$ to be up-converted from the processing circuit 856 to the high gain mixer 818. Once the mixer module $D_2$ 836 is activated and powered up, the Band D transmitter module 858 may utilize the high power, high gain mixer 818 to up-convert the baseband signal $S_O$. Utilizing a high power, high gain mixer 818 helps ensure that the output RF signal $Tx_{out}$ is transmitted at a high enough power level (and signal distortion is kept minimal) so that stations receiving the RF signal $Tx_{out}$ can accurately receive and demodulate the signal.

For example, the Band D transmitter module 858 may wish to up-convert, amplify, and transmit a baseband signal $S_O$ to one or more receiving stations (not shown). The baseband signal $S_O$ may be generated by the processing circuit 856 and have a power level below a threshold value. As a result, the processing circuit 856 transmits a control signal 824 to the mixer module $D_1$ 832 to activate and power ON the short LO signal path $D_1$ 834 (including any associated circuitry) and the low power, low gain mixer 808. The processing circuit 856 may also transmit a control signal 822 to the mixer module $D_2$ 836 to deactivate and power OFF the long LO signal path $D_2$ 838 (including any associated circuitry) and the high power, high gain mixer 818. The control signal 824 may also close the switch 828 so that the baseband signal $S_O$ to be up-converted is provided to the low gain, lower power mixer 808. The mixer 808 receives the baseband signal $S_O$ from the processing circuit 856, and the LO signal from the VCO 852 via the LO signal path $D_1$ 834. The mixer 808 up-converts the baseband signal $S_O$ to, for example, an RF signal, and the transmit amplifier 810 amplifies the RF signal to transmit the output RF signal $Tx_{out}$. Thus, by utilizing the low power circuit components, including the buffers 802, 806, divider 804, and low gain mixer 808, the Band D transmitter module 858 is able to conserve power.

Next, the Band D transmitter module 858 may wish to up-convert, amplify, and transmit another baseband signal $S_O$ to one or more receiving stations (not shown). The baseband signal $S_O$ may be generated by the processing circuit 856 and have a power level above a threshold value. As a result, the processing circuit 856 transmits a control signal 822 to the mixer module $D_2$ 836 to activate and power ON the long LO signal path $D_2$ 838 (including any associated circuitry) and the high power, high gain mixer 818. The processing circuit 856 may also transmit a control signal 824 to the mixer module $D_1$ 832 to deactivate and power OFF the short LO signal path $D_1$ 834 (including any associated circuitry) and the low power, low gain mixer 808. The control signal 822 may also close the switch 826 so that the baseband signal $S_O$ to be up-converted is provided to the high gain, high power mixer 818. The mixer 818 receives the baseband signal $S_O$ from the processing circuit 856, and the LO signal from the VCO 852 via the LO signal path $D_2$ 838. The mixer 818 up-converts the baseband signal $S_O$ to, for example, an RF signal, and the transmit amplifier 810 amplifies the RF signal to transmit the output RF signal $Tx_{out}$.

Thus, the transmitter 800 conserves power during times when the baseband signal $S_O$ power level is low because the mixer module $D_1$ 832 components performing the up-conversion, including the buffers 802, 806, frequency divider 804, and low gain mixer 808, consume less current and power than their high power counterparts in mixer module $D_2$ 836. The transmitter 800 takes advantage of the low power, low gain mixer 808 when the relatively low output power of the RF signal to be transmitted does not necessitate the use of the high gain, low noise mixer 818 for up-conversion. Moreover, the transmitter 800 conserves power by taking advantage of the close placement of the mixer module $D_1$ 832 components, including the buffers 802, 806, frequency divider 804, and low gain mixer 808, to the VCO 852. As described above, placing/routing the low power, low gain mixer 808 proximate to the VCO 852 allows the LO signal path $D_1$ circuitry 834, including the buffers 802, 806 and the frequency divider 804, to be scaled significantly smaller (i.e., they consume less current and power) than the LO signal path $D_2$ circuitry 838 since less current drive is necessary to drive the LO signal to the low gain mixer 808. In other aspects of the disclosure, placing/routing the low power, low gain mixer 808 proximate to the VCO 852 allows the LO signal path $D_1$ 834 circuitry to include fewer buffers and/or other circuit components, thereby further reducing power consumption by the LO signal path $D_1$ 834. Consequently, the higher the proportion of time that the Band D transmitter module 858 up-converts baseband signals using the mixer module $D_1$, the more power the transmitter 800 conserves.

Figure 9:
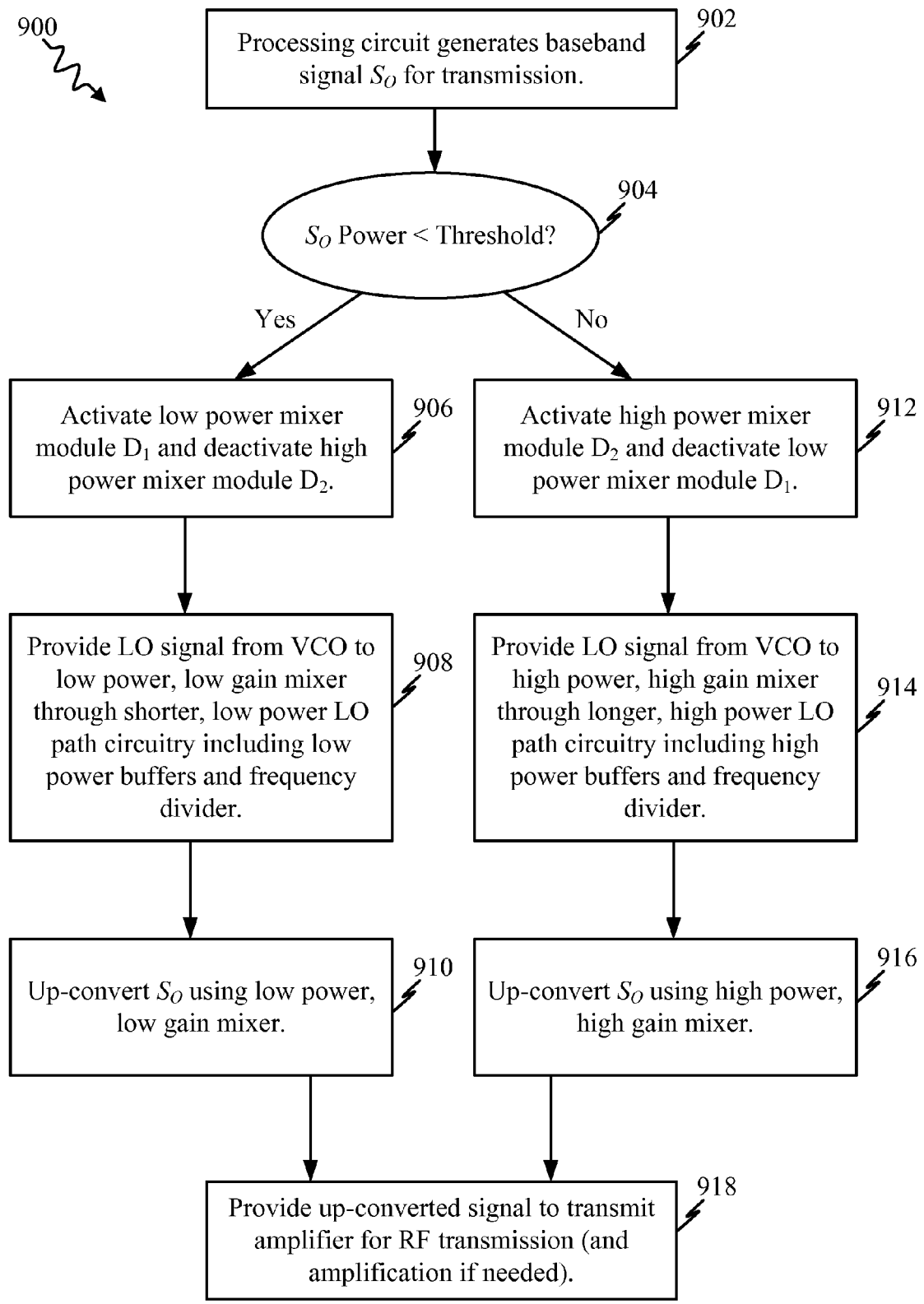
FIG. 9 illustrates a flow chart for providing a low LO signal for a low power transmitter.

FIG. 9 illustrates a flow chart 900 for providing a low power LO signal for a low power transmitter according to one aspect of the disclosure. Referring to FIGS. 8 and 9, at step 902, the processing circuit 856 generates a baseband signal $S_O$ (e.g., a "data signal"). At step 904, the processing circuit 856 may determine whether the power of the baseband signal $S_O$ is greater than a predefined threshold value. If it is determined that the power of $S_O$ is greater than the predefined threshold value, then at step 906 the low power mixer module $D_1$ 832 is activated and the high power mixer module $D_2$ 836 is deactivated. For example, the processing circuit 856 may transmit a control signal 824 to the low power mixer module $D_1$ 832 that activates the mixer module $D_1$ 832, and another control signal 822 may be transmitted to the high power mixer module $D_2$ 836 that deactivates the mixer module $D_2$ 836. Activating the mixer module $D_1$ 832 may include powering up the LO signal path $D_1$ 834 circuitry that includes the buffers 802, 806 and the frequency divider 804, powering up the low gain mixer 808, and closing the switch 828 to provide the baseband signal $S_O$ to the low gain mixer 808. Deactivating the mixer module $D_2$ 836 may include powering down the LO signal path $D_2$ 838 circuitry that includes the buffers 812, 816 and the frequency divider 814, powering down the high gain mixer 818, and opening the switch 826 to disconnect the baseband signal $S_O$ from the high gain mixer 818.

At step 908, the LO signal may be provided from the VCO 852 to the low gain mixer 808 through the short, low power LO signal path $D_1$ 834, including the low power buffers 802, 806 and the low power frequency divider 804. At step 910, the low gain mixer 808 up-converts the baseband signal $S_O$ to RF. At step 918, the up-converted output signal from the low gain mixer 808 is provided to the transmit amplifier 810 for transmission (and amplification if needed) as the RF output signal $Tx_{out}$.

If, however, it is determined at step 904 that the power of $S_O$ is greater than the predefined threshold value, then at step 912, the high power mixer module $D_2$ 836 is activated and the low power mixer module $D_1$ 832 is deactivated. For example, the processing circuit 856 may transmit a control signal 822 to the high power mixer module $D_2$ 836 that activates the mixer module $D_2$ 836, and another control signal 824 may be transmitted to the low power mixer module $D_1$ 832 that deactivates the mixer module $D_1$ 832. Activating the mixer module $D_2$ 836 may include powering up the LO signal path $D_2$ 838 circuitry that includes the buffers 812, 816 and the frequency divider 814, powering up the high gain mixer 818, and closing the switch 826 to provide the baseband signal $S_O$ to the high gain mixer 818. Deactivating the mixer module $D_1$ 832 may include powering down the LO signal path $D_1$ 834 circuitry that includes the buffers 802, 806 and the frequency divider 804, powering down the low gain mixer 808, and opening the switch 828 to disconnect the output baseband signal $S_O$ from the low gain mixer 808.

At step 914, the LO signal may be provided from the VCO 852 to the high gain mixer 818 through the long, high power LO signal path $D_2$ 838, including the high power buffers 812, 816 and the high power frequency divider 814. At step 916, the high gain mixer 818 up-converts the baseband signal $S_O$ to RF. At step 918, the up-converted output signal from the high gain mixer 818 is provided to the transmit amplifier 810 for transmission (and amplification if needed) as the RF output signal $Tx_{out}$.

Figure 10:
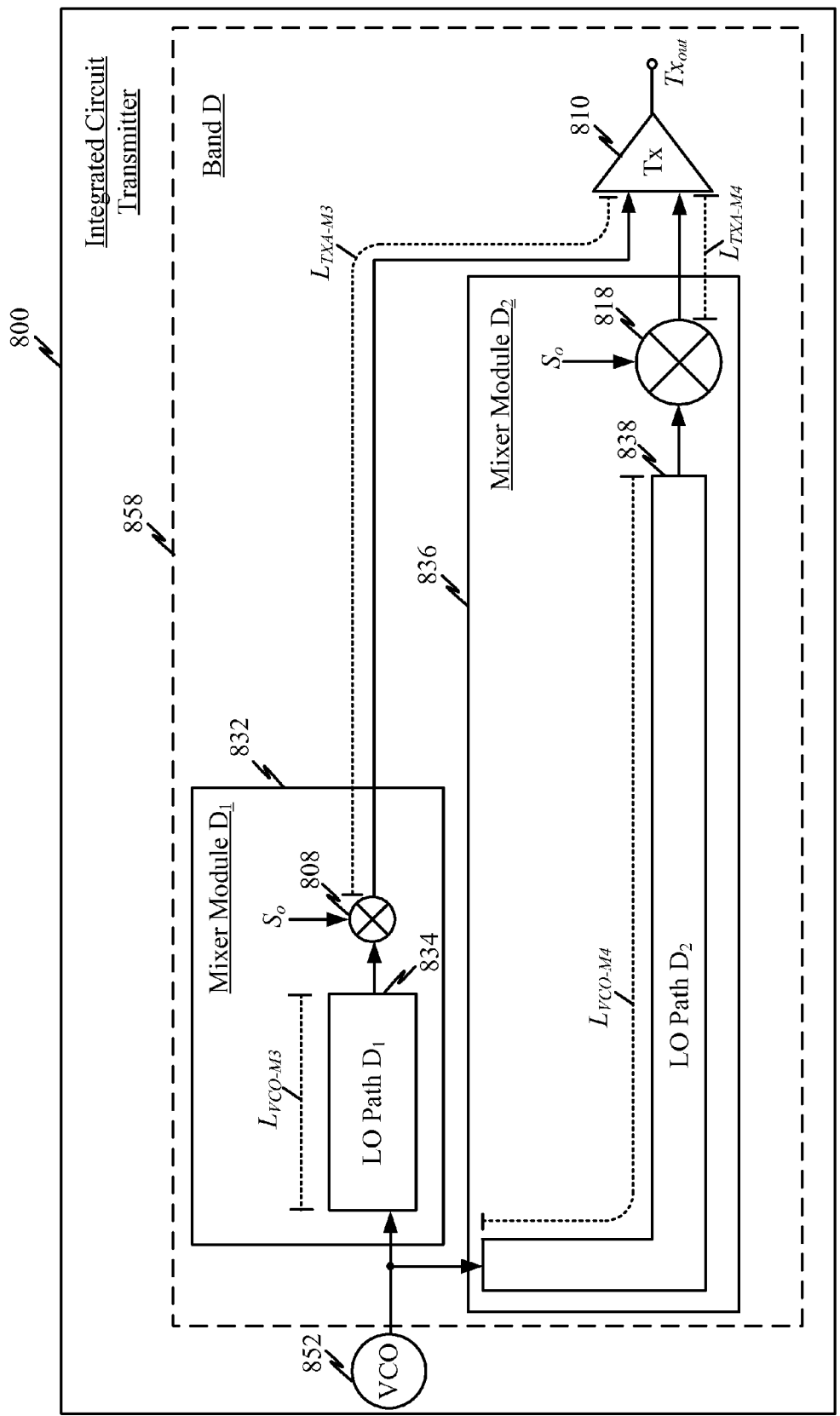
FIG. 10 illustrates a functional block diagram of the integrated circuit transmitter that includes a low power band D transmitter module.

FIG. 10 illustrates a functional block diagram of the integrated circuit transmitter 800 that includes a low power band D transmitter module 858 according to one aspect of the disclosure. As shown in the illustrated example, the path length $L_{VCO-M3}$ (e.g., a "first electrical path length") defines the on-chip electrical path length (e.g., routing length of the first path) between the VCO 852 and the low gain mixer 808. Thus, the electrical path length $L_{VCO-M3}$ has a direct effect on the resistance, capacitance, and signal loss experienced by the LO signal being provided/distributed from the VCO 852 to the low gain mixer 808. Similarly, the path length $L_{VCO-M4}$ (e.g., a "second electrical path length") defines the on-chip electrical path length (e.g., routing length of the second path) between the VCO 852 and the high gain mixer 818. Thus, the electrical path length $L_{VCO-M4}$ has a direct effect on the resistance, capacitance, and signal loss experienced by the LO signal being provided/distributed from the VCO 852 to the high gain mixer 818. FIG. 10 clearly shows that the electrical path length $L_{VCO-M3}$ is shorter than the electrical path length $L_{VCO-M4}$, and therefore the electrical path length $L_{VCO-M4}$ may require larger circuit components (e.g., buffers, dividers, etc.) to drive the LO signal from the VCO 852 to the high gain mixer 818.

In one aspect of the disclosure, the path length $L_{VCO-M3}$ is between 1% and 10% of the path length $L_{VCO-M4}$. In another aspect of the disclosure, the path length $L_{VCO-M3}$ is between 10% and 25% of the path length $L_{VCO-M4}$. In yet another aspect of the disclosure, the path length $L_{VCO-M3}$ is between 25% and 50% of the path length $L_{VCO-M4}$. In yet another aspect of the disclosure, the path length $L_{VCO-M3}$ is between 50% and 75% of the path length $L_{VCO-M4}$. In yet another aspect of the disclosure, the path length $L_{VCO-M3}$ is between 75% and 99% of the path length $L_{VCO-M4}$. As just one example, the path length $L_{VCO-M3}$ may be equal to or less than 200 microns and/or the path length $L_{VCO-M4}$ may be greater than or equal to 2,000 microns. As another example, the path length $L_{VCO-M3}$ may be equal to or less than 500 microns and/or the path length $L_{VCO-M4}$ may be greater than or equal to 1,000 microns.

As shown in the illustrated example, the path length $L_{TXA-M3}$ (e.g., a "third electrical path length") defines the on-chip electrical path length (e.g., length of routing) between the transmit amplifier 810 and the low gain mixer 808. Similarly, the path length $L_{TXA-M4}$ (e.g., a "fourth electrical path length") defines the on-chip electrical path length (e.g., length of routing) between the transmit amplifier 810 and the high gain mixer 818. FIG. 10 shows that the electrical path length $L_{TXA-M3}$ is longer than the electrical path length $L_{TXA-M4}$.

In one aspect of the disclosure, the path length $L_{TXA-M4}$ is between 1% and 10% of the path length $L_{TXA-M3}$. In another aspect of the disclosure, the path length $L_{TXA-M4}$ is between 10% and 25% of the path length $L_{TXA-M3}$. In yet another aspect of the disclosure, the path length $L_{TXA-M4}$ is between 25% and 50% of the path length $L_{TXA-M3}$. In yet another aspect of the disclosure, the path length $L_{TXA-M4}$ is between 50% and 75% of the path length $L_{TXA-M3}$. In yet another aspect of the disclosure, the path length $L_{TXA-M4}$ is between 75% and 99% of the path length $L_{TXA-M3}$. As just one example, the path length $L_{TXA-M4}$ may be equal to or less than 200 microns and/or the path length $L_{TXA-M3}$ may be greater than or equal to 2,000 microns. As another example, the path length $L_{TXA-M4}$ may be equal to or less than 500 microns and/or the path length $L_{TXA-M3}$ may be greater than or equal to 1,000 microns.

Referring to FIGS. 8 and 10, in one aspect of the disclosure, the LO path $D_1$ 834 circuitry may be scaled such that it is less than 34% the size (transistor width, driving capability, etc.) of the LO path $D_2$ 838 circuitry. For example, one or more components of the LO path $D_1$ 834 circuitry, including the pre-divider buffer 802, the frequency divider 804, and/or the post-divider buffer 806 may be scaled such that they are less than 34% the size (transistor width, driving capability, etc.) of corresponding components in the LO path $D_2$ 838 circuitry (e.g., pre-divider buffer 812, the frequency divider 814, and/or the post-divider buffer 816). In another aspect of the disclosure, the LO path $D_1$ 834 circuitry may be scaled such that it is between 34% and 67% of the size of the LO path $D_2$ 838 circuitry. For example, one or more components of the LO path $D_1$ 834 circuitry, including the pre-divider buffer 802, the frequency divider 804, and/or the post-divider buffer 806 may be scaled such that they are between 34% and 67% of the size of corresponding components in the LO path $D_2$ 838 circuitry (e.g., pre-divider buffer 812, the frequency divider 814, and/or the post-divider buffer 816). In yet another aspect of the disclosure, the LO path $D_1$ 834 circuitry may be scaled such that it is between 67% and 95% of the size of the LO path $D_2$ 838 circuitry. For example, one or more components of the LO path $D_1$ 834 circuitry, including the pre-divider buffer 802, the frequency divider 804, and/or the post-divider buffer 806 may be scaled such that they are between 67% and 95% of the size of corresponding components in the LO path $D_2$ 838 circuitry (e.g., pre-divider buffer 812, frequency divider 814, and/or post-divider buffer 816).

In another aspect of the disclosure, the low gain, low power mixer 808 may be scaled such that it is less than 34% of the size (transistor width, driving capability, etc.) of the high power, high gain mixer 818. In another aspect of the disclosure, the low gain, low power mixer 808 may be scaled such that it is between 34% and 67% of the size of the high power, high gain mixer 818. In another aspect of the disclosure, the low gain, low power mixer 808 may be scaled such that it is between 67% and 95% of the size of the high power, high gain mixer 818. Referring to FIG. 8, in another aspect of the disclosure, the diversity buffer 854 may also be scaled down in size to match the ratio between the low gain mixer 808 and the high gain mixer 818. That is, if the low gain mixer 808 is scaled down to 33% of the size of the high gain mixer 818, then the diversity buffer 854 may be scaled down to 33% of its original size (e.g., the original size being the size of the diversity buffer used in an aspect of the receiver not featuring mixer module $D_1$). In another aspect of the disclosure, the diversity buffer 854 may be scaled down in size to match the ratio between the LO signal path $D_1$ 834 circuitry and the LO signal path $D_2$ 838 circuitry. That is, if the LO signal path $D_1$ 834 circuitry is scaled down to 33% of the size of the LO signal path $D_2$ 838 circuitry, then the diversity buffer 854 may be scaled down to 33% of its original size (e.g., the original size being the size of the diversity buffer used in an aspect of the receiver not featuring mixer module $D_1$). In other aspects, the diversity buffer 854 may be scaled down by different amounts.

According to one aspect, the high power pre-divider buffer 812, high power frequency divider 814, the high power post-divider buffer 816, and the high power, high gain mixer 818 may each be scaled such that they are four (4) times larger (transistor width, driving capability, etc.) than their corresponding low power counterparts: the pre-divider buffer 802, frequency divider 804, the post-divider buffer 806, and the low power, low gain mixer 808.

Figure 11:
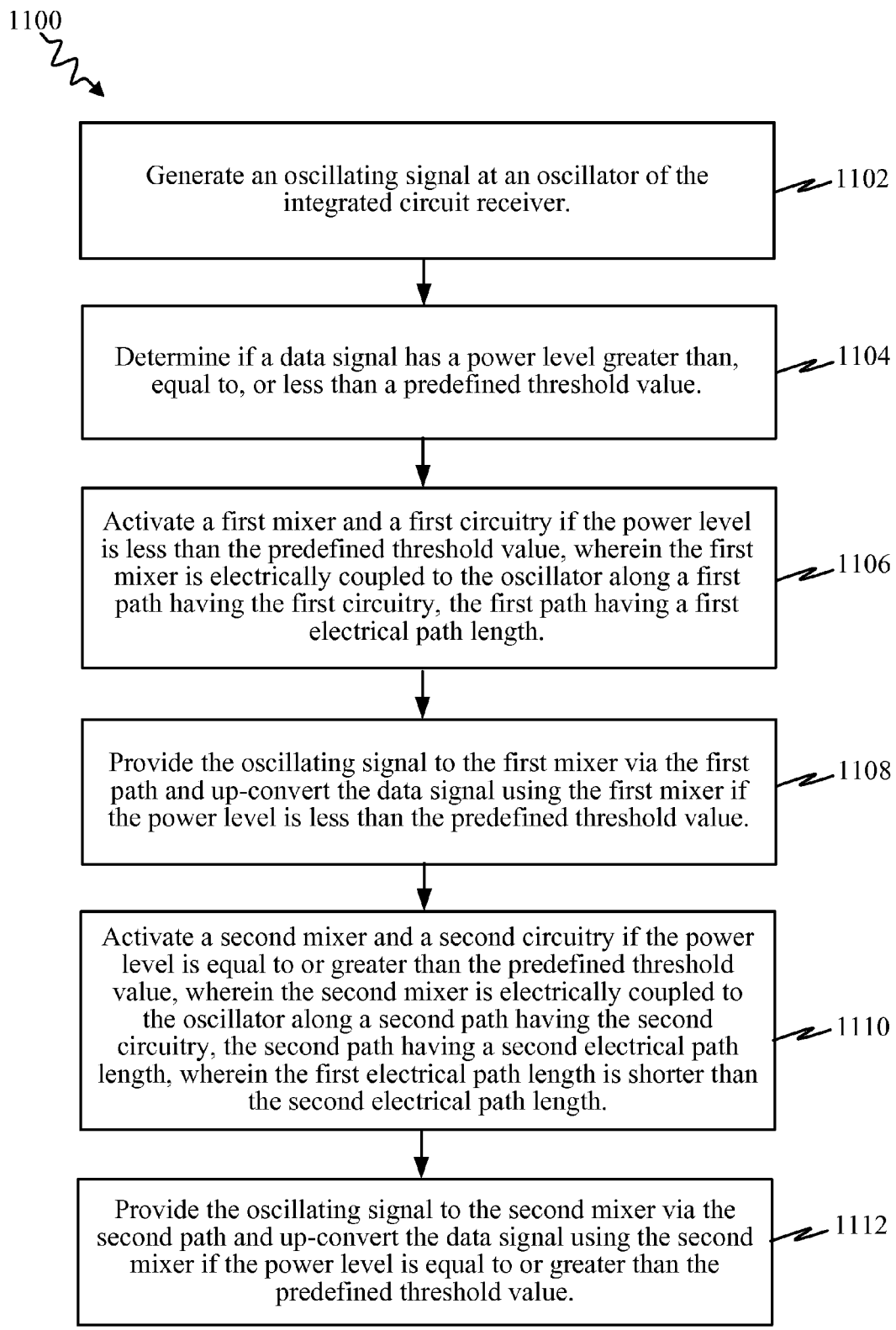
FIG. 11 illustrates a flow chart for a low power method for providing an oscillating signal within an integrated circuit transmitter.

FIG. 11 illustrates a flow chart 1100 for a low power method for providing an oscillating signal within an integrated circuit transmitter according to one aspect of the disclosure. At step 1102, an oscillating signal is generated at an oscillator of the integrated circuit transmitter. At step 1104, it is determined if a data signal has a power level greater than, equal to, or less than a predefined threshold value. At step 1106, a first mixer and a first circuitry is activated if the power level is less than the predefined threshold value, wherein the first mixer is electrically coupled to the oscillator along a first path having the first circuitry, and the first path has a first electrical path length. At step 1108, the oscillating signal is provided to the first mixer via the first path and the data signal is up-converted using the first mixer if the power level is less than the predefined threshold value. At step 1110, a second mixer and a second circuitry is activated if the power level is equal to or greater than the predefined threshold value, wherein the second mixer is electrically coupled to the oscillator along a second path having the second circuitry, and the second path has a second electrical path length, Moreover, the first electrical path length is shorter than the second electrical path length. At step 1112, the oscillating signal is provided to the second mixer via the second path and the data signal is up-converted using the second mixer if the power level is equal to or greater than the predefined threshold value. In at least one aspect of the disclosure, activating the first mixer, the first circuitry, the second mixer, and/or the second circuitry includes powering up the first mixer, the first circuitry, the second mixer, and/or the second circuitry to a power ON state. In at least one aspect of the disclosure, deactivating the first mixer, the first circuitry, the second mixer, and/or the second circuitry includes powering down the first mixer, the first circuitry, the second mixer, and/or the second circuitry to a power OFF state.

Figure 12:
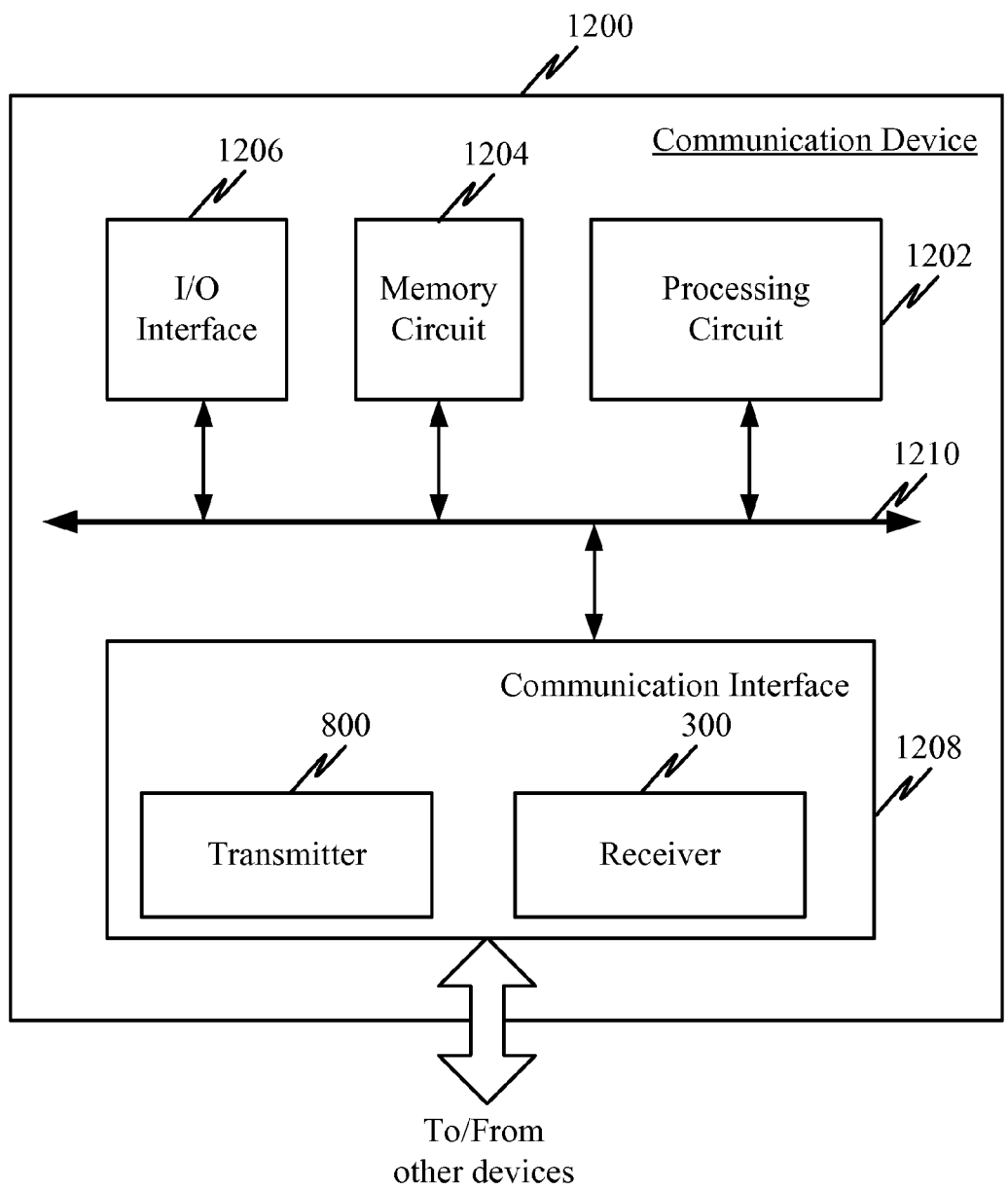
FIG. 12 illustrates a functional block diagram of an electronic communications device that includes a low power receiver and low power transmitter.

FIG. 12 illustrates a functional block diagram of an electronic communications device 1200 featuring the receiver 300 (See FIG. 3) and/or the transmitter 800 (See FIG. 8) according to one aspect of the disclosure. Referring to FIG. 12, the communications device 1200 may be any communications device capable of wireless and/or wired communication, including, but not limited to, a mobile phone, a smartphone, a computer, a laptop, a tablet, a radio, a base station, a Node B, an evolved Node B (e-Node B), etc. The communications device 1200 may include a processing circuit 1202, a memory circuit 1204, an input/output (I/O) interface 1206, and/or a communication interface 1208. The processing circuit 1202, the memory circuit 1204, the input/output (I/O) interface 1206, and/or the communication interface 1208 may be communicatively coupled to each other through a bus 1210. The communication interface 1208 includes the transmitter 800 and/or the receiver 300.

The processing circuit 1202 (e.g., processor, one or more processing modules, etc.) may transmit control signals to the receiver 300 that control operation of various mixers 326, 328 and LO path 327, 329 circuitry in the receiver 300. For example, the processing circuit 1202 may transmit the control signals 422, 424 illustrated in FIG. 4. The processing circuit 1202 may also transmit control signals to the transmitter 800 that control operation of various mixers 808, 818 and LO path 834, 838 circuitry in the transmitter 800. For example, the processing circuit 1202 may transmit the control signals 822, 824 illustrated in FIG. 8. Referring to FIG. 12, the processing circuit 1202 may also receive down-converted signals from the receiver 300 for additional processing, including, filtering, demodulation, etc. The processing circuit 1202 may also provide the transmitter 800 baseband signals $S_O$ for up-conversion and RF transmission.

According to one aspect, the processing circuit 1202 may be a specialized processor (e.g., an application specific integrated circuit (ASIC)) that serves as just one example of a: means for determining if a data signal has a power level greater than, equal to, or less than a predefined threshold value; means for activating a first mixer and a first circuitry if the power level is greater than the predefined threshold value, wherein the first mixer is electrically coupled to the oscillator along a first path having the first circuitry, the first path having a first electrical path length; means for providing the oscillating signal to the first mixer via the first path and down-converting the data signal using the first mixer if the power level is greater than the predefined threshold value; means for activating a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length; and means for providing the oscillating signal to the second mixer via the second path and down-converting the data signal using the second mixer if the power level is equal to or less than the predefined threshold value.

According to another aspect, the processing circuit 1202 may be a specialized processor (e.g., ASIC) that serves as just one example of a: means for activating a first mixer and a first circuitry if the power level is less than the predefined threshold value, wherein the first mixer is electrically coupled to the oscillator along a first path having the first circuitry, the first path having a first electrical path length; means for providing the oscillating signal to the first mixer via the first path and up-converting the data signal using the first mixer if the power level is less than the predefined threshold value; means for activating a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length; and means for providing the oscillating signal to the second mixer via the second path and up-converting the data signal using the second mixer if the power level is equal to or greater than the predefined threshold value.

The memory circuit 1204 (e.g., memory) may be, for example, volatile or non-volatile memory, including, but not limited to, FLASH memory, volatile RAM, magnetic hard disk, optical hard disk, etc. The memory circuit 1204 may store one or more computer readable instructions that may be executed by the processor 1202. The I/O interface 1206 may include, but is not limited to, keyboards, keypads, touch-screen displays, pointers, trackballs, displays, etc. The communication interface 1208 may be a wireless communication interface that allows the communications device 1200 to wirelessly communicate with other devices. The communication interface 1208 may include the receiver 300 and/or transmitter 800, and thus, the communications device 1200 may conserve power by taking advantage of the power saving aspects of the low power receiver 300 and/or low power transmitter 800.

One or more of the components, steps, features, and/or functions illustrated in FIGS. 1, 2, 3, 4, 5, 6, 7, 8, 9, 10, 11, and/or 12 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 3, 4, 6, 8, 10, and/or 12 may be configured to perform one or more of the methods, features, or steps described in FIGS. 5, 7, 9, and/or 11. The algorithms described herein may also be efficiently implemented in software and/or embedded in hardware. While various examples and/or illustrations herein may refer to integrated circuits, it should be clear that the various features described are not limited to integrated circuits and are applicable in various other types of circuits.

Moreover, in one aspect of the disclosure, the processing circuit 304 illustrated in FIGS. 3 and 4 may be a specialized processor (e.g., an application specific integrated circuit (e.g., ASIC)) that is specifically designed and/or hard-wired to perform the algorithms, methods, and/or steps described in FIGS. 5 and/or 7. Thus, such a specialized processor (e.g., ASIC) may be one example of a means for executing the algorithms, methods, and/or steps described in FIGS. 5 and/or 7. In another aspect of the disclosure, the processing circuit 856 illustrated in FIG. 8 may be a specialized processor (e.g., an application specific integrated circuit (e.g., ASIC)) that is specifically designed and/or hard-wired to perform the algorithms, methods, and/or steps described in FIGS. 9 and/or 11. Thus, such a specialized processor (e.g., ASIC) may be one example of a means for executing the algorithms, methods, and/or steps described in FIGS. 9 and/or 11. In another aspect of the disclosure, the processing circuit 1202 illustrated in FIG. 12 may be a specialized processor (e.g., ASIC) that is specifically designed and/or hard-wired to perform the algorithms, methods, and/or steps described in FIGS. 5, 7, 9, and/or 11. Thus, such a specialized processor (e.g., ASIC) may be one example of a means for executing the algorithms, methods, and/or steps described in FIGS. 5, 7, 9, and/or 11. The memory circuit 1204 may also store processor 1202 readable instructions that when executed by a specialized processor (e.g., ASIC) causes the specialized processor to perform the algorithms, methods, and/or steps described in FIGS. 5, 7, 9, and/or 11.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for providing an oscillating signal within a receiver circuit, the method comprising:
   generating the oscillating signal at an oscillator of the receiver circuit;
   determining if a data signal has a power level greater than, equal to, or less than a predefined threshold value;
   activating a first mixer and a first circuitry if the power level is greater than the predefined threshold value, wherein the first mixer is electrically coupled to the oscillator along a first path having the first circuitry, the first path having a first electrical path length;
   providing the oscillating signal to the first mixer via the first path and down-converting the data signal using the first mixer if the power level is greater than the predefined threshold value;
   activating a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length; and
   providing the oscillating signal to the second mixer via the second path and down-converting the data signal using the second mixer if the power level is equal to or less than the predefined threshold value.

2. The method of claim 1, wherein the first circuitry is adapted to consume less power in a power ON state than the second circuitry in a power ON state.

3. The method of claim 1, further comprising:
   deactivating the first mixer and the first circuitry if the data signal has a power level equal to or less than the predefined threshold value; and
   deactivating the second mixer and the second circuitry if the data signal has a power level greater than the predefined threshold value.

4. The method of claim 1, wherein circuit components of the first circuitry are scaled smaller than circuit components of the second circuitry.

5. The method of claim 4, wherein the circuit components of the first circuitry includes at least one of a first pre-divider buffer, a first frequency divider, and/or a first post-divider buffer, and the circuit components of the second circuitry includes at least one of a second pre-divider buffer, a second frequency divider, and/or a second post-divider buffer.

6. The method of claim 1, wherein the first mixer is adapted to consume less power in an ON state than the second mixer in an ON state.

7. The method of claim 1, wherein the first mixer is scaled smaller than the second mixer.

8. The method of claim 1, wherein the receiver circuit is a multi-band integrated circuit receiver.

9. The method of claim 1, wherein the first mixer is placed on the receiver circuit closer to the oscillator than the second mixer is to the oscillator.

10. The method of claim 1, wherein the first electrical path length is less than half of the second electrical path length.

11. The method of claim 1, wherein the first electrical path length is less than ten percent (10%) of the second electrical path length.

12. The method of claim 1, further comprising:
    receiving the data signal at an amplifier of the receiver circuit, wherein the data signal received is a radio frequency (RF) signal.

13. The method of claim 12, wherein the second mixer is placed on the receiver circuit closer to the amplifier than the first mixer is to the amplifier.

14. The method of claim 12, wherein a third electrical path length between the second mixer and the amplifier is less than half of a fourth electrical path length between the first mixer and the amplifier.

15. A receiver circuit, comprising:
    an oscillator adapted to generate an oscillating signal; and
    a processing circuit communicatively coupled to the oscillator, the processing circuit adapted to
        determine if a data signal has a power level greater than, equal to, or less than a predefined threshold value,
        activate a first mixer and a first circuitry if the power level is greater than the predefined threshold value, wherein the first mixer is electrically coupled to the oscillator along a first path having the first circuitry, the first path having a first electrical path length,
        provide the oscillating signal to the first mixer via the first path and down-convert the data signal using the first mixer if the power level is greater than the predefined threshold value,
        activate a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length, and
        provide the oscillating signal to the second mixer via the second path and down-convert the data signal using the second mixer if the power level is equal to or less than the predefined threshold value.

16. The receiver circuit of claim 15, wherein the first circuitry is adapted to consume less power in a power ON state than the second circuitry in a power ON state.

17. The receiver circuit of claim 15, wherein the processing circuit is further adapted to:
    deactivate the first mixer and the first circuitry if the data signal has a power level equal to or less than the predefined threshold value; and
    deactivate the second mixer and the second circuitry if the data signal has a power level greater than the predefined threshold value.

18. The receiver circuit of claim 15, wherein the first mixer is adapted to consume less power in an ON state than the second mixer in an ON state.

19. A receiver circuit, comprising:
    means for generating an oscillating signal;
    means for determining if a data signal has a power level greater than, equal to, or less than a predefined threshold value;
    means for activating a first mixer and a first circuitry if the power level is greater than the predefined threshold value, wherein the first mixer is electrically coupled to the oscillator along a first path having the first circuitry, the first path having a first electrical path length;

means for providing the oscillating signal to the first mixer via the first path and down-converting the data signal using the first mixer if the power level is greater than the predefined threshold value;

means for activating a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length; and means for providing the oscillating signal to the second mixer via the second path and down-converting the data signal using the second mixer if the power level is equal to or less than the predefined threshold value.

20. The receiver circuit of claim 19, wherein the first circuitry is adapted to consume less power in a power ON state than the second circuitry in a power ON state.

21. The receiver circuit of claim 19, further comprising:
means for deactivating the first mixer and the first circuitry if the data signal has a power level equal to or less than the predefined threshold value; and
means for deactivating the second mixer and the second circuitry if the data signal has a power level greater than the predefined threshold value.

22. The receiver circuit of claim 19, wherein the first mixer is adapted to consume less power in an ON state than the second mixer in an ON state.

23. A non-transitory processor-readable medium having instructions stored thereon for providing an oscillating signal within a receiver circuit, which when executed by at least one processor causes the processor to:
generate the oscillating signal;
determine if a data signal has a power level greater than, equal to, or less than a predefined threshold value;
activate a first mixer and a first circuitry if the power level is greater than the predefined threshold value, wherein the first mixer is electrically coupled to the oscillator along a first path having the first circuitry, the first path having a first electrical path length;
provide the oscillating signal to the first mixer via the first path and down-convert the data signal using the first mixer if the power level is greater than the predefined threshold value;
activate a second mixer and a second circuitry if the power level is equal to or less than the predefined threshold value, wherein the second mixer is electrically coupled to the oscillator along a second path having the second circuitry, the second path having a second electrical path length, wherein the first electrical path length is shorter than the second electrical path length; and
provide the oscillating signal to the second mixer via the second path and down-convert the data signal using the second mixer if the power level is equal to or less than the predefined threshold value.

24. The processor-readable medium of claim 23, wherein the first circuitry is adapted to consume less power in a power ON state than the second circuitry in a power ON state.

25. The processor-readable medium of claim 23, wherein the instructions which when executed by the processor further causes the processor to:
deactivate the first mixer and the first circuitry if the data signal has a power level equal to or less than the predefined threshold value; and
deactivate the second mixer and the second circuitry if the data signal has a power level greater than the predefined threshold value.

26. The processor-readable medium of claim 23, wherein the first mixer is adapted to consume less power in an ON state than the second mixer in an ON state.

27. A method for providing an oscillating signal within a transmitter circuit, the method comprising:
generating the oscillating signal at an oscillator of the transmitter circuit;
determining if a data signal has a power level greater than, equal to, or less than a predefined threshold value;
activating a first mixer and a first circuitry if the power level is less than the predefined threshold value, wherein the first mixer is electrically coupled to the oscillator along a first path having the first circuitry, the first path having a first electrical path length;
providing the oscillating signal to the first mixer via the first path and up-converting the data signal using the first mixer if the power level is less than the predefined threshold value;
activating a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length; and
providing the oscillating signal to the second mixer via the second path and up-converting the data signal using the second mixer if the power level is equal to or greater than the predefined threshold value.

28. The method of claim 27, wherein the first circuitry is adapted to consume less power in a power ON state than the second circuitry in a power ON state.

29. The method of claim 27, further comprising:
deactivating the first mixer and the first circuitry if the data signal has a power level equal to or greater than the predefined threshold value; and
deactivating the second mixer and the second circuitry if the data signal has a power level less than the predefined threshold value.

30. The method of claim 27, wherein circuit components of the first circuitry are scaled smaller than circuit components of the second circuitry.

31. The method of claim 30, wherein the circuit components of the first circuitry includes at least one of a first pre-divider buffer, a first frequency divider, and/or a first post-divider buffer, and the circuit components of the second circuitry includes at least one of a second pre-divider buffer, a second frequency divider, and/or a second post-divider buffer.

32. The method of claim 27, wherein the first mixer is adapted to consume less power in an ON state than the second mixer in an ON state.

33. The method of claim 27, wherein the first mixer is scaled smaller than the second mixer.

34. The method of claim 27, wherein the transmitter circuit is a multi-band transmitter.

35. The method of claim 27, wherein the first mixer is placed on the transmitter circuit closer to the oscillator than the second mixer is to the oscillator.

36. The method of claim 27, wherein the first electrical path length is less than half of the second electrical path length.

37. The method of claim 27, wherein the first electrical path length is less than ten percent (10%) of the second electrical path length.

38. The method of claim 27, further comprising:
receiving the data signal from a processing circuit of the transmitter circuit, wherein the data signal received is a baseband signal.

39. The method of claim 27, further comprising:
providing the up-converted data signal to a transmit amplifier of the transmitter circuit.

40. The method of claim 39, wherein a third electrical path length between the second mixer and the transmit amplifier is less than half of a fourth electrical path length between the first mixer and the transmit amplifier.

41. A transmitter circuit, comprising:
an oscillator adapted to generate an oscillating signal; and
a processing circuit communicatively coupled to the oscillator, the processing circuit adapted to determine if a data signal has a power level greater than, equal to, or less than a predefined threshold value,
activate a first mixer and a first circuitry if the power level is less than the predefined threshold value, wherein the first mixer is electrically coupled to the oscillator along a first path having the first circuitry, the first path having a first electrical path length,
provide the oscillating signal to the first mixer via the first path and up-convert the data signal using the first mixer if the power level is less than the predefined threshold value,
activate a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length, and
provide the oscillating signal to the second mixer via the second path and up-convert the data signal using the second mixer if the power level is equal to or greater than the predefined threshold value.

42. The transmitter circuit of claim 41, wherein the first circuitry is adapted to consume less power in a power ON state than the second circuitry in a power ON state.

43. The transmitter circuit of claim 41, wherein the processing circuit is further adapted to:
deactivate the first mixer and the first circuitry if the data signal has a power level equal to or greater than the predefined threshold value; and
deactivate the second mixer and the second circuitry if the data signal has a power level less than the predefined threshold value.

44. A transmitter circuit, comprising:
means for generating the oscillating signal at an oscillator of the transmitter circuit;
means for determining if a data signal has a power level greater than, equal to, or less than a predefined threshold value;
means for activating a first mixer and a first circuitry if the power level is less than the predefined threshold value, wherein the first mixer is electrically coupled to the oscillator along a first path having the first circuitry, the first path having a first electrical path length;
means for providing the oscillating signal to the first mixer via the first path and up-converting the data signal using the first mixer if the power level is less than the predefined threshold value;
means for activating a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length; and
means for providing the oscillating signal to the second mixer via the second path and up-converting the data signal using the second mixer if the power level is equal to or greater than the predefined threshold value.

45. The transmitter circuit of claim 44, wherein the first circuitry is adapted to consume less power in a power ON state than the second circuitry in a power ON state.

46. The transmitter circuit of claim 44, further comprising:
means for deactivating the first mixer and the first circuitry if the data signal has a power level equal to or greater than the predefined threshold value; and
means for deactivating the second mixer and the second circuitry if the data signal has a power level less than the predefined threshold value.

47. A non-transitory processor-readable medium having instructions stored thereon for providing an oscillating signal within an transmitter circuit, which when executed by at least one processor causes the processor to:
generate the oscillating signal at an oscillator of the transmitter circuit;
determine if a data signal has a power level greater than, equal to, or less than a predefined threshold value;
activate a first mixer and a first circuitry if the power level is less than the predefined threshold value, wherein the first mixer is electrically coupled to the oscillator along a first path having the first circuitry, the first path having a first electrical path length;
provide the oscillating signal to the first mixer via the first path and up-converting the data signal using the first mixer if the power level is less than the predefined threshold value;
activate a second mixer and a second circuitry if the power level is equal to or greater than the predefined threshold value, wherein the second mixer is electrically coupled to the oscillator along a second path having the second circuitry, the second path having a second electrical path length, wherein the first electrical path length is shorter than the second electrical path length; and
provide the oscillating signal to the second mixer via the second path and up-converting the data signal using the second mixer if the power level is equal to or greater than the predefined threshold value.

48. The processor-readable medium of claim 47, wherein the first circuitry is adapted to consume less power in a power ON state than the second circuitry in a power ON state.

49. The processor-readable medium of claim 47, wherein the instructions which when executed by the processor further cause the processor to:
deactivate the first mixer and the first circuitry if the data signal has a power level equal to or greater than the predefined threshold value; and
deactivate the second mixer and the second circuitry if the data signal has a power level less than the predefined threshold value.

* * * * *